(12) United States Patent
Biebesheimer et al.

(10) Patent No.: US 6,701,311 B2
(45) Date of Patent: Mar. 2, 2004

(54) CUSTOMER SELF SERVICE SYSTEM FOR RESOURCE SEARCH AND SELECTION

(75) Inventors: Debra L. Biebesheimer, Carmel, NY (US); Donn P. Jasura, Staatsburg, NY (US); Neal M. Keller, Somers, NY (US); Daniel A. Oblinger, New York, NY (US); Mark E. Podlaseck, New Preston, CT (US); Stephen J. Rolando, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 09/778,146

(22) Filed: Feb. 7, 2001

(65) Prior Publication Data

US 2002/0107842 A1 Aug. 8, 2002

(51) Int. Cl.$^7$ .............................................. G06F 17/30
(52) U.S. Cl. ................................ 707/5; 707/3; 707/10; 707/100; 707/104; 707/201
(58) Field of Search ............................... 705/5, 6, 8, 9, 705/14, 1, 35, 27; 707/3, 10, 7, 201, 104, 100; 709/204, 206, 248, 214, 278

(56) References Cited

U.S. PATENT DOCUMENTS

| | | | | |
|---|---|---|---|---|
| 5,021,953 A | * | 6/1991 | Webber et al. | 705/6 |
| 5,237,499 A | * | 8/1993 | Garback | 705/5 |
| 5,303,361 A | | 4/1994 | Colwell et al. | 701/4 |
| 5,321,833 A | | 6/1994 | Chang et al. | 707/5 |
| 5,446,891 A | | 8/1995 | Kaplan et al. | 707/2 |
| 5,524,187 A | | 6/1996 | Feiner et al. | 345/449 |
| 5,546,516 A | | 8/1996 | Austel et al. | 345/440 |
| 5,600,835 A | | 2/1997 | Garland et al. | 707/5 |
| 5,608,899 A | | 3/1997 | Li et al. | 707/4 |
| 5,619,709 A | | 4/1997 | Caid et al. | 715/532 |
| 5,710,899 A | | 1/1998 | Eick | 345/764 |
| 5,724,567 A | | 3/1998 | Rose et al. | 707/2 |
| 5,754,939 A | | 5/1998 | Herz et al. | 455/304 |

(List continued on next page.)

OTHER PUBLICATIONS

"The Answer Machine" (Information Services Management) (Industry Trend or Event), by Susan Feldman, Jan. 2000, The Magazine for Database Professionals, 41 pages.

(List continued on next page.)

Primary Examiner—Shahid Al Alam
Assistant Examiner—Fred Echichioya
(74) Attorney, Agent, or Firm—Scully, Scott, Murphy & Presser; Daniel P. Morris, Esq.

(57) ABSTRACT

A customer self service system and method for performing resource search and selection. The method includes steps of providing an interface enabling entry of a query for a resource and specification of one or more user context elements, each element representing a context associated with the current user state and having context attributes and attribute values associated therewith; enabling user specification of relevant resource selection criteria for enabling expression of relevance of resource results in terms of user context; searching a resource database and generating a resource response set having resources that best match a user's query, user context attributes and user defined relevant resource selection criteria; presenting said resource response set to the user in a manner whereby a relevance of each of the resources being expressed in terms of user context in a manner optimized to facilitate resource selection; and, enabling continued user selection and modification of context attribute values to enable increased specificity and accuracy of a user's query to thereby result in improved selection logic and attainment of resource response sets best fitted to the query. More particularly, adaptive algorithms and supervised and unsupervised learning sub-processes are implemented to enable the self service resource search and selection system to learn from each and all users and make that learning operationally benefit all users over time.

51 Claims, 10 Drawing Sheets

U.S. PATENT DOCUMENTS

| | | | |
|---|---|---|---|
| 5,768,578 A | 6/1998 | Kirk et al. | 707/100 |
| 5,787,422 A | 7/1998 | Tukey et al. | 707/5 |
| 5,794,178 A | 8/1998 | Caid et al. | 704/9 |
| 5,826,260 A | 10/1998 | Byrd, Jr. et al. | 707/5 |
| 5,841,437 A | 11/1998 | Fishkin et al. | 345/619 |
| 5,850,531 A | 12/1998 | Cox et al. | 345/781 |
| 5,918,217 A | 6/1999 | Maggioncalda et al. | 705/36 |
| 5,930,501 A | 7/1999 | Neil | 713/400 |
| 5,974,412 A | 10/1999 | Hazlehurst et al. | 703/3 |
| 5,999,927 A | 12/1999 | Tukey et al. | 707/5 |
| 6,014,661 A | 1/2000 | Ahlberg et al. | 707/3 |
| 6,097,386 A | 8/2000 | Bardon et al. | 345/866 |
| 6,105,023 A | 8/2000 | Callan | 707/5 |
| 6,442,526 B1 * | 8/2002 | Vance et al. | 705/5 |

OTHER PUBLICATIONS

Billsus, D., et al., "A learning agent for wireless news access," Proceedings of IUI 2000: International Conference on Intelligent User Interfaces, ACM, 9–12 Jan. 2000, pp. 33–36, XP–002205011.

Olsen, K., et al., "Visualization of a Document Collection: The Vibe System", Information Processing & Management, Elsevier, Barking, GB, vol. 29, No. 1, 1993, pp. 69–81, XP 000574984.

Mladenic, D, "Text–learning and related intelligent agents: a survey", IEEE Intelligent Systems, IEEE, vol. 14, No. 4, Jul. 1999 (1999–07), pp. 44–54, XP–002205012.

Göker, A., "Capturing Information Need by Learning User Context", 16th International Joint Conferent In Artificial Intelligence: Learning About User Workshop, 31 Jul. 1999 (1999–07–31), pp. 21–27, XP–002205013.

Anonymous, "Taxonomized Web Search", IBM Technical Disclosure Bulletin, IBM Corp. New York, US, vol. 40, No. 5, 1 May 1997 (1997–05–01), pp. 195–196, XP–002133594; and Davies, J., et al., "Knowledge Discovery And Delivery", British Telecommunications Engineering, London, GB, vol. 17, No. 1, 1 Apr. 1998 (1998–04–01), pp. 25–35, XP000765546.

* cited by examiner

FIG. 3

| | EDUCATION (EX: ENVIRONMENT) 60 | EDUCATION (EX: SUBJECT MATTER) 70 | REAL ESTATE 80 | TRAVEL 90 |
|---|---|---|---|---|
| USER QUERY | LEARN LOTUS NOTES AT HOME 61 | BECOME A LINUX DEVELOPER BY JUNE 71 | FIND HOUSING NEAR NEW JOB BY AUGUST 81 | PLAN A TRIP TO VERMONT IN JUNE 91 |
| USER CONTEXT | CORP EXEC AT HQ REMOTE STAFFIE COMMUTING TECHIE TRAVELING CONSULTANT 62 | CORP EXEC AT HQ REMOTE STAFFIE COMMUTING TECHIE TRAVELING CONSULTANT 72 | RELOCATING BUSINESS PROFESSIONAL EMPTY NESTER COLLEGE STUDENT 82 | SINGLE MOM W/KIDS SWINGING SINGLES BUSINESS TRAVELER 92 |
| CONTEXT ATTRIBUTE | CONNECTIVITY LEARNING MODE(S) TECHNICAL FIELD 63 | CONNECTIVITY LEARNING MODE(S) TECHNICAL FIELD 73 | MODE OF COMMUTE TO WORK/SCHOOL MODE OF HOUSING MAINTENANCE STYLE 83 | MODE OF TRANSPORTATION MODE OF HOUSING FOOD STYLE 93 |
| ATTRIBUTE VALUE | LAN CONNECTED DIAL UP DSL DISCONNECTED 64 | SECURITY GRAPHICAL INTERFACES PROGRAMMING SYSTEMS INTEGRATION 74 | CAREFREE LIVING SUBCONTRACT IT ALL DO-IT-YOURSELF-ER 84 | DRIVE FLY TRAIN 94 |
| VALUE RESOURCE PARAMETERS | INCLUDE: DOWNLOAD & PLAY RESOURCES -------- EXCLUDE: ON LINE COLLABORATIVE RESOURCES 65 | INCLUDE KDE -------- EXCLUDE GNOME 75 | INCLUDE WALLS INCLUDE PAINT INCLUDE LAWN MOWING -------- EXCLUDE PLUMBING EXCLUDE ELECTRICAL EXCLUDE LANDSCAPING 85 | INCLUDE ALL MAJOR CARRIERS -------- EXCLUDE PROP PLANES EXCLUDE BAD SAFETY RECORDS 95 |
| RESOURCE SELECTION CRITERIA & VALUES | COST TIME QUALITY RISK 66 | COST TIME QUALITY RISK 76 | COST TIME QUALITY RISK 86 | COST TIME QUALITY RISK 96 |

CUSTOMER SELF SERVICE SYSTEM FOR RESOURCE SEARCH AND SELECTION

BACKGROUND OF THE INVENTION

1. Field of the Invention

This invention relates generally to the fields of knowledge management systems, information portals, research, catalog search, search engines, and data miners, and particularly, to a comprehensive customer self service system for resource search and selection implementing novel graphical user interface and machine learning components.

2. Discussion of the Prior Art

Currently there exist many systems designed to perform search and retrieval functions. These systems may be classified variously as knowledge management systems, information portals, search engines, data miners, etc. However, providing effective customer self service systems for resource search and selection presents several significant challenges. The first challenge for current systems with query capability is that serving queries intelligently requires a large amount of user supplied contextual information, while at the same time the user has limited time, patience, ability and interest to provide it. The second challenge is that searching without sufficient context results in a very inefficient search (both user time and system resource intensive) with frequently disappointing results (overwhelming amount of information, high percentage of irrelevant information). The third challenge is that much of a user's actual use and satisfaction with search results differ from that defined at the start of the search: either because the users behave contrary to their own specifications, or because there are other contextual issues at play that have not been defined into the search.

While many search systems today use an iconic interface to capture the query, they do not incorporate a rich set of contextual attributes and, they do not incorporate the user's past interaction. The prior art has separately addressed the use of the history of interaction with the user or their current service environment to provide context for a resource search and selection system. The prior art also assumes the shallow context of a single user query stream focused on a single topic. A major limitation of these approaches is to continue to burden the user with providing substantial contextual information and inability of such systems to apply specific user context to improve resource selection for other users on the same subject. While some search systems today use an iconic interface to display the results of a search, they do not include ranking by sets of contextual decision criteria. Users are forced to select from returned resources on the basis of content alone and actually begin using the resources before they realize the resources are not appropriate in the user's complete context. While some search systems today may track a user's use of the system, they don't use that information to develop a better query interface over time and to better inform the search both real time and historically regarding this user, particularly in a predictive or directive fashion.

One consequence of these process and systems limitations is that the primary user will frequently turn to an intermediate person to provide them with the desired end-product, or to research and analyze the various resources that may be available to them. Generally speaking this human resource is not consistently accessible and/or available in the time, timeframe, and quantity desired. Generally speaking, this human resource comes at an additional cost (direct or indirect) in the process, creating an expensive solution to the user's need than a self service approach could provide.

It would be highly desirable to provide a customer self service system that entirely eliminates the need to utilize intermediate persons in some instances, or, at a minimum, is capable of assisting these intermediate persons to be more effective.

While the end user (or their selected intermediaries) may "search" a broad universe of resources, seeking the specific instances that will serve, there is another set of potential users who need to survey the same data, but for the converse rationale. Individuals and organizations who are developing and supplying the resources being queried, look at their "product" and want to know what resources may exist to compete with, complement, precede, follow, or obviate the need for their product, it's marketing or delivery channel. The limitations in the existing systems impact these individuals and organizations by reducing effectiveness and increasing cost of market research, market planning, strategic planning and implementation activities.

Some representative prior art database/resource search, retrieval and selection systems that requires some measure of interactivity and implements graphical or visual interfaces include those described in U.S. Pat. No. 5,303,361 entitled "Search and Retrieval System"; U.S. Pat. No. 5,524,187 entitled "Worlds-Within-Worlds Nested Display and Interaction System and Method"; U.S. Pat. No. 5,546,516 entitled "System and Method for Visually Querying a Data Set Exhibited in a Parallel Coordinate System"; U.S. Pat. No. 5,600,835 entitled "Adaptive Non-Literal Text String Retrieval"; U.S. Pat. No. 5,608,899 entitled "Method and Apparatus for Searching a Database by Interactively Modifying a Database Query"; U.S. Pat. No. 5,710,899 entitled "Interactive Selectors for Selecting Subsets of a Set of Values"; U.S. Pat. No. 5,768,578 entitled "User Interface for Information Retrieval System"; U.S. Pat. No. 5,841,437 entitled "Method and Apparatus for Interactive Database Queries via Movable Viewing Operation Regions"; U.S. Pat. No. 5,918,217 entitled "User Interface for a Financial Advisory System"; U.S. Pat. No. 5,930,501 entitled "Pictorial User Interface for Establishing Time of Day and Geographical or Environmental Context on a Computer Display or Other Monitor"; U.S. Pat. No. 5,974,412 entitled "Intelligent Query System for Automatically Indexing Information in a Database and Automatically Categorizing Users"; U.S. Pat. No. 5,999,927 entitled "Method and Apparatus for Information Access Employing Overlapping Clusters"; U.S. Pat. No. 5,787,422 entitled "Method and Apparatus for Information Access Employing Overlapping Clusters; U.S. Pat. No. 6,105,023 entitled "System and Method for Filtering a Document Stream"; and, an article by Susan Feldman entitled "The Answering Machine," in Searcher: The Magazine for Database Professionals, 1, 8, January, 2000/58.

Representative prior art references addressing the issue of providing some element of context to search and retrieval systems includes U.S. Pat. No. 5,619,709 entitled "System and Method of Context Vector Generation and Retrieval"; U.S. Pat. No. 5,794,178 entitled "Visualization of Information Using Graphical Representations of Context Vector Based Relationships and Attributes"; U.S. Pat. No. 6,014,661 entitled "System and Method for Automatic Analysis of Data Bases and for User-Controlled Dynamic Querying"; U.S. Pat. No. 6,097,386 entitled "Data Processing System Having Context Sensitive Visual Feedback for User Interface Controls and Method Therefor".

The prior art has additionally addressed the use of some of the features of the resources (content and other) in relation to the user's context and/or prior use of other resource search and selection systems, for selection of responses to current user's queries. Representative prior art approaches systems described in U.S. Pat. No. 5,724,567 entitled "System for Directing Relevance-Ranked Data Objects to Computer Users"; U.S. Pat. No. 5,754,939 entitled "System for Generation of User Profiles For a System For Customized Electronic Identification of Desirable Objects"; and, U.S. Pat. No. 5,321,833 entitled "Adaptive Ranking System for Information Retrieval".

While the prior art has addressed the issues of database searching, dynamic query formulation, and the visual representation of multidimensional data, newer search engines are just beginning to use some of these ideas to express queries and results. There has heretofore never been an information search and retrieval method which facilitates the efficient location of relevant resources by the busy user by enabling the expression of a user's context as part of the query, and the relevance of the results to that context. Further, there is notably absent in the art one system that provides an end-to-end solution integrating the user and system, the content and user context, and the search and result, that would enable a self service resource search and selection system to learn from each and all users and make that learning operationally benefit all users over time.

SUMMARY OF THE INVENTION

It is an object of the present invention to provide a novel customer self service resource search and selection system that captures the user's question or search parameters, researches all the relevant resources to directly answer the question or to better inform the user about the subject area, presents the resources in a fashion that clarifies understanding of the resource opportunity and, facilitates decision making/selection between the various resources.

It is another object of the present invention to provide a novel customer self service resource search and selection system that performs an initial process resulting in the discovery and/or acquisition of the search responses, and a secondary process resulting in system-enabled "learning" about both users and resources which enables improved performance by the system both within one session and subsequently over time.

It is a further object of the present invention to provide an intuitive graphical user interface (GUI) for a customer self service system enabling resource search and selection, the GUI providing elements enabling entry of query search terms, selection and fine tuning of user context definitions associated with a query (context includes, for example, the user's computing environment), establishment of inclusionary and exclusionary resource filters, and specification of resource priorities including the selection, sequencing and weighting of relevant resource evaluation criteria.

It is yet another object of the present invention to provide an intuitive GUI for a customer self service system for resource search and selection that permits visualization and exploration and manipulation of the response set through multidimensional context variables and, particularly presents the resource response set in a way which clearly illustrates their degree of fit with the user's most important context variables, as indicated by their prior usage of the system, as well as by context choices for a current user query.

It is still another object of the present invention to provide in a customer self service system for resource search and selection, a mechanism for supplying annotations to query response sets that affect the order that these resources are presented to the user by a visualization system. Further to this object, it is an additional object of the invention to implement in the annotation mechanism, a supervised learning algorithm wherein training data utilized for this algorithm is derived from prior user interactions and the annotation function is optimized based on an annotation scoring metric.

It is another object of the present invention to provide in a customer self service system for resource search and selection, a mechanism for providing a response set based on user queries and derived user contexts that is adaptable for modifying output response sets in accordance with different user contexts and user interactions as they change over time. Further to this object, it is another object of the present invention to provide an adaptive indexing function that implements a supervised learning algorithm to produce a resource response set based on a user query.

It is yet a further object of the present invention to provide in a customer self service system for resource search and selection, a mechanism for applying user context for the purpose of more efficient resource dispersion and, for improving the relevance of search results for a given user in their current context without requiring the user to explicitly train the system. Further to this object, it is an object of the present invention to implement a supervised machine learning algorithm that receives a set of historical user interaction records in order to classify context attributes that are relevant for that particular user of the system.

It is yet still another object of the present invention to provide in a customer self service system for resource search and selection, an automatic clustering process that discovers related queries and enables the inference of new relevant context terms and generation of corresponding graphical icons used to describe the users and their interactive situations. Further to this object, it is an object of the present invention to provide an unsupervised machine learning technique for enabling clustering of sets of user interaction records to discover groups of similarly situated queries.

According to the invention, there is provided a customer self service system and method for performing resource search and selection. The method includes steps of providing an interface enabling entry of a query for a resource and specification of one or more user context elements, each element representing a context associated with the current user state and having context attributes and attribute values associated therewith; enabling user specification of relevant resource selection criteria for enabling expression of relevance of resource results in terms of user context; searching a resource database and generating a resource response set having resources that best match a user's query, user context attributes and user defined relevant resource selection criteria; presenting said resource response set to the user in a manner whereby a relevance of each of the resources being expressed in terms of user context in a manner optimized to facilitate resource selection; and, enabling continued user selection and modification of context attribute values to enable increased specificity and accuracy of a user's query to thereby result in improved selection logic and attainment of resource response sets best fitted to the query. More particularly, adaptive algorithms and supervised and unsupervised learning sub-processes are implemented to enable the self service resource search and selection system to learn from each and all users and make that learning operationally benefit all users over time.

Advantageously, such a customer self service system is applicable to a variety of customer self service domains including, but not limited to: education, real estate and travel.

BRIEF DESCRIPTION OF THE DRAWINGS

Further features, aspects and advantages of the apparatus and methods of the present invention will become better understood with regard to the following description, appended claims, and the accompanying drawings where:

FIG. 3 provides examples of data elements from the education, real estate and travel domains given example user interactions with the customer self service system via the graphic interfaces.

DETAILED DESCRIPTION OF THE PREFERRED EMBODIMENTS

Figure 1:
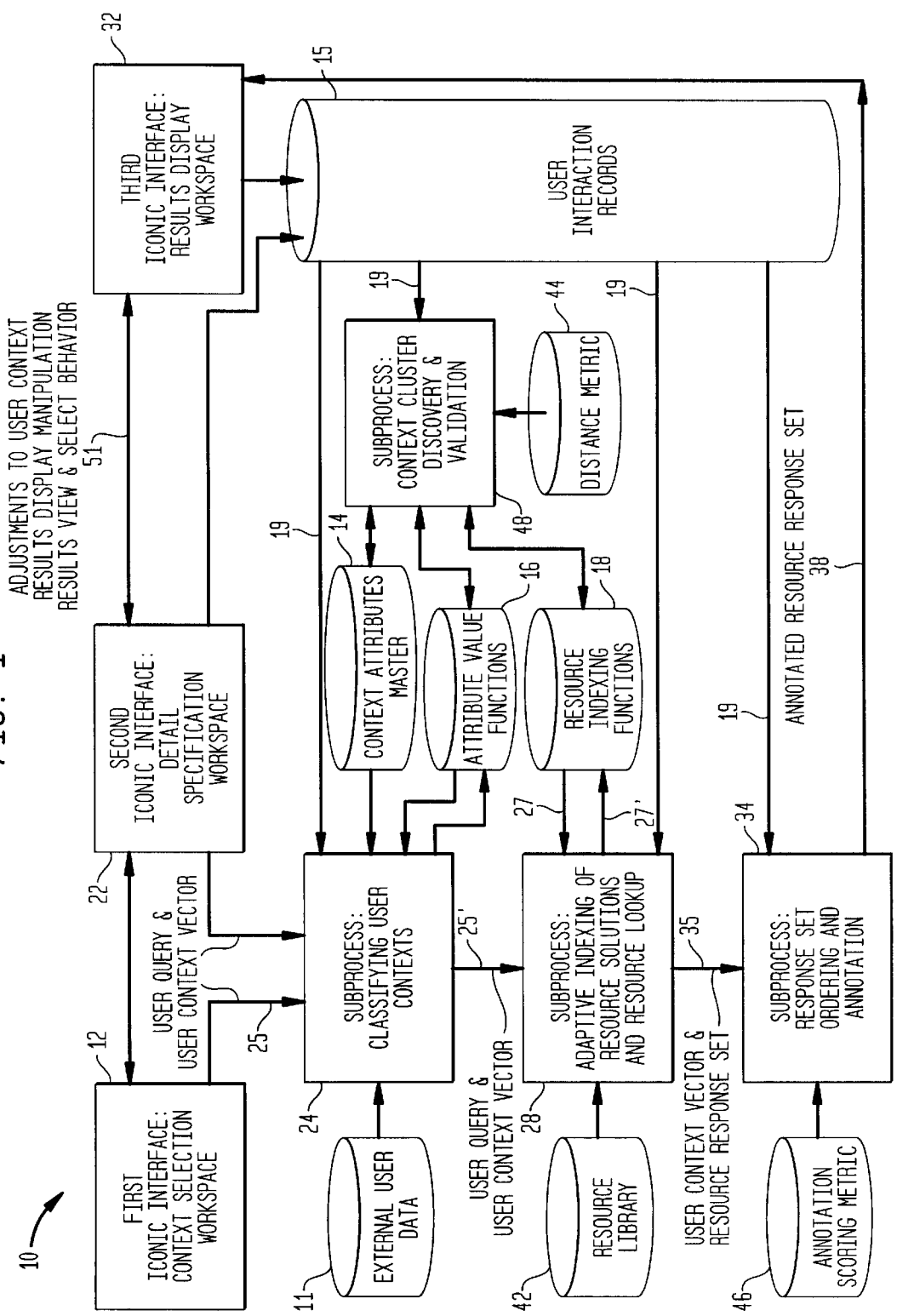
FIG. 1 is a block diagram depicting the architecture and conceptual system flow of the customer self service system 10 of the invention.

FIG. 1 is a block diagram depicting the architecture and conceptual system flow of the customer self service system 10 of the invention. The system 10 is a comprehensive self service system providing an end-to-end solution that integrates the user and system, the content and context, and, the search and result so that the system may learn from each and all users and make that learning operationally benefit all users over time. Particularly, as shown in FIG. 1, the self service system provides a three-part intuitive iconic interface comprising interface components 12, 22 and 32 for visualizing and exploring the set of resources that the system has found to match the user's initial query and related subject and context variables. The system 10 preferably enables the expression of a user's context as part of the query and expresses the relevance of the results to a particular user via the interface in terms beyond that of the results' content. The resource set is presented to the user in a way which clearly illustrates their degree of fit with the user's most important context variables, as indicated by their prior usage of the system, as well as by context choices for the current query. The system displays the resources in the sequence specified by the user and enables the user to select and weight the criteria to be used in interpreting and selecting between resources. This provides a shifting of the user's focus from finding something, to making choices among the set of resources available. Via the interface components 12, 22 and 32, the user may redefine their query, preview some or all of the suggested resources or further reduce, and redisplay the response set to extract those with the best degree of fit with that user's current needs. The system generates and displays via the interface a listing of the currently active inclusionary and exclusionary content filters and provides a means for modifying them. More specifically, the intuitive user interface of the invention enables users to specify the variables of their resource needs.

Figure 2:
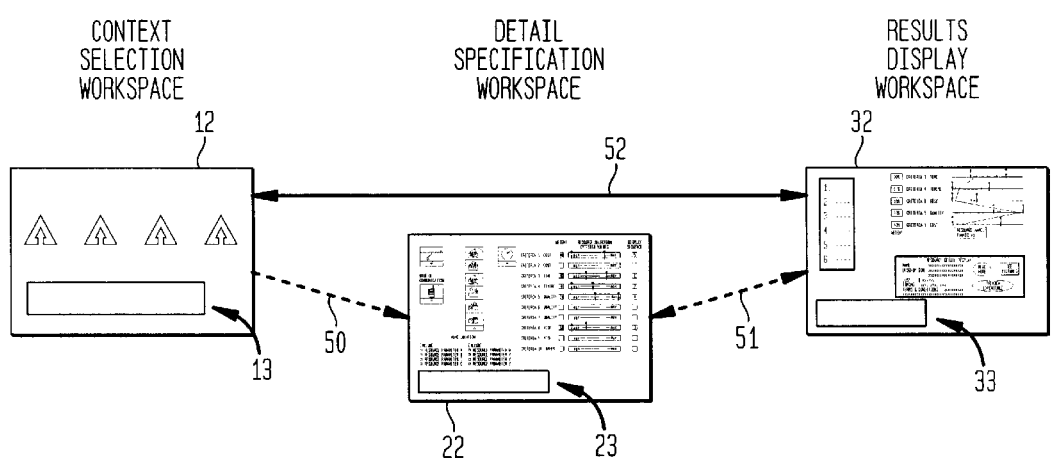
FIG. 2 is a flowchart showing the generic process steps of the user's interaction with the customer self service system through various graphic interfaces.

FIGS. 1 and 2 particularly depict a reduced-size, three-part intuitive graphic user interface (GUI) that enables users to enter queries and manipulate the system's responses according to their resource needs. The three-part intuitive graphic user interface comprises: a first graphical user interface 12 including an initial Context Selection Workspace 13 that enables the expression of user context as part of a query in a manner optimized for ease of use; a second graphical user interface 22 including a Detailed Specification Workspace 23 that includes a visual representation of multi-dimensional data for expressing query and results that enables users to completely manage their search in a manner optimized for simplicity and clarity of logic; and, a third graphical user interface 32 including a Results Display Workspace 33 that enables expression of relevance of results in terms of user context in a manner optimized to facilitate resource selection using user supplied decision criteria. Aspects of interfaces 12, 22 and 32 shown in FIGS. 1 and 2 are described in greater detail herein.

Referring back to FIG. 1, behind the scenes, as will be described in greater detail, there is a set of sub-system components that cooperate to derive, assume, sense and infer particular user contexts with minimal user effort. These components include databases such as: 1) a Context Attributes Master database 14 which stores the definitions of all the attributes known to the system and their relationships to predefined user contexts; 2) an Attribute Value Functions database 16 which stores the definitions and logic associated with assigning a value to an attribute for specific instances (context default, groups of users); 3) a Resource Indexing Functions database 18 which stores the definitions and logic for mapping specific resources to specific context sets; and, 4) a historical User Interaction Records database 15 which stores the users' prior queries, responses, and interactions with the system 10. The first three databases are created before system startup and the User Interaction Records 15 is created with the first user/use of the system, however, it is understood that all four databases are maintained and enhanced through system operations described below.

First, prior to a user signing on to the system, and before the user first views the iconic interface 12, the system 10 performs several pre-processing steps including: 1) creating of an empty "user context vector" 25 and populating the context vector with minimal information from external data elements 11 integrated with the system or, from system sensing/discovery; and, 2) processing the minimal user context vector 25 against the Context Attributes database 14, the Attribute Value Functions database 16, and the User Interaction Records database 15 using context classification logic to result in a "suggestion" that this particular user may be classified into one of a small number of user context definitions from the system's predefined long list of context definitions. After these pre-processing steps, the first iconic interface 12 is then displayed for the user at the user's terminal, or web-browser, in the case of resource searches conducted over a web-based communication link. The iconic Context Selection Workspace 13 initially displays a small set of User Context Icons it has determined are most appropriate, captures the user's selection of the one that seems most fitting for the current user search session, and captures the user's actual query. In most cases, this minimal entry will suffice to begin the search because the system has already determined the relevant attributes, default values and parameters to drive the system forward through the user search without any additional entry on the user's part. However, if the user wishes to review their defaults or to fine tune some context or resource variables, there is an option to proceed to the iconic Detailed Specification Workspace display 22 before starting the search. These two workspaces 12, 22 and their iconic elements will be described more fully herein.

Regardless of the screen navigation path chosen, when the user initiates the query, the system 10 packages the user query with a detailed User Context Vector 25 summarizing what is known of the user's needs at this point. Once the search is initiated, the query and context vector are processed sequentially through three distinct sub-processes: 1) a Classifying User Contexts sub-process 24; 2) an Adaptive Indexing of Resource Solutions and Resource Lookup sub-process 28; and, 3) a Response Set Ordering and Annotation sub-process 34.

Specifically, the Classifying User Contexts sub-process 24, receives as input the user query and the raw context vector 25 and External User Data 11, and processes these against the User Interaction records 19 for this user/user group, data from the Context Attributes Master 14 and Attribute Value Functions 16. The system classifies this specified user interaction state and annotates the context vector 25' with a complete set of context parameters for use in subsequent processing. The Classifying User Contexts sub-process 24 particularly applies an inductive learning algorithm as an attempt to predict derived contexts. Additionally, the Classifying User Contexts sub-process 24 updates the Attribute Value Functions database 16 with more enhanced functions.

Figure 6:
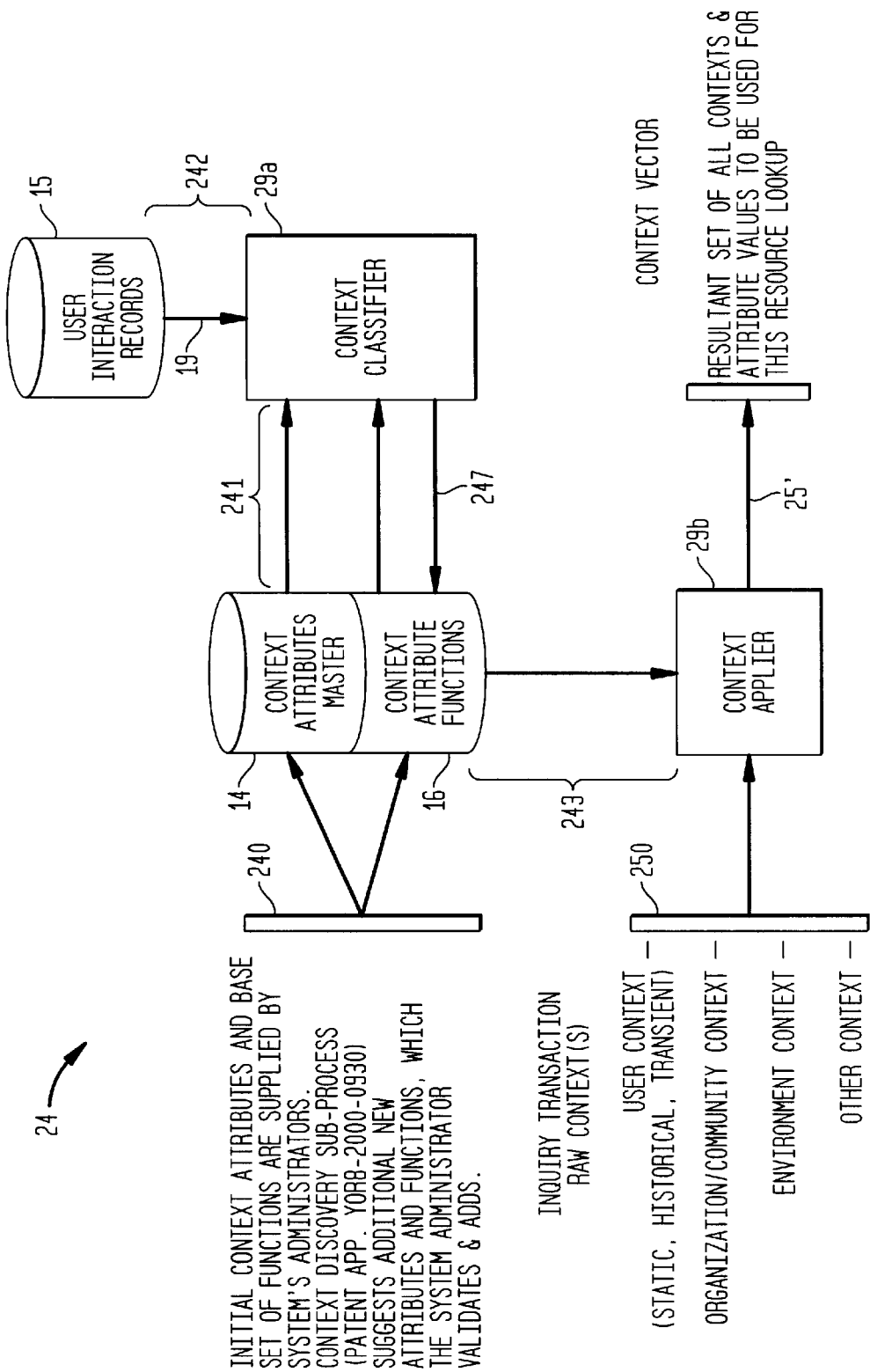
FIG. 6 is a flowchart depicting the Classifying User Contexts sub-process of the customer self service system of the invention.

FIG. 6 illustrates the specific control flow of the Classifying User Contexts sub-process 24 according to the present invention, and particularly, the methodology implemented for classifying a specified user interaction state and annotating it with a complete set of context parameters for use in the ensuing search processes. According to the invention, the term "context" includes a very broad range of "attribute—value pairs" which describe a user, including, but not limited to, their knowledge of a customer service domain, their organizational and community contexts, their user environments (including technology capabilities) and other items of static, historical or transient nature.

For the purpose of this invention the terms rule and function are used interchangeably. Both refer to any data structure that can be executed by an interpreter in a way as to compute a set of labeled output values given a set of labeled input values. An example of an arithmetic rule is "Fahrenheit<−Centigrade* 5/9+32". Rule languages include, but are not limited to: neural nets, decision trees, functional languages, polynomial functions.

To accomplish this task of classifying a specified user interaction state and annotating it with context parameters for use in the ensuing search, three asynchronous operations are executed: 1) a first operation involving periodic data creation and maintenance; 2) a second operation occurring frequently or continuously in the background and involving system learning from historical transactions; and 3) a third operation that occurs when the user initiates or refines a query to the system and necessarily requires both of first and second operations to execute as a prerequisite.

More particularly, in the first operation, 241 the system is supplied with an ever-improving "master" set of context attributes 14 and associated functions 16 for assigning default values to those attributes. Particularly, the context attributes master 14 includes the name of the contexts, it's attributes, and the icons for display via the interface (FIG. 2) that represent each context and attribute. The context attribute functions 16 are the rules, i.e., software code, that compute values for each of the context attributes. For example, when the self service system is implemented for learning in an education capacity or domain, a rule may enumerate the list of people in a college or in-house class or, in a more complex example, it may look at the parameters surrounding a user's connectivity to see if it is low or high bandwidth, etc. It is understood that a startup set of attributes and functions 240 relate to operational domains, e.g. education, real-estate, travel, and are initially defined by system administrators and available at system initiation. On an ongoing basis, a sub-process, described herein applies machine learning to the identification of additional contexts and facilitates the system administrator's validation of contexts and creation of newly derived context attributes in the master set 14. In most instances, functions associated with those attributes are automatically generated by a context classifier process 29a in the manner described herein. However, this Context Classifier process 29a does enable the systems administrator to manually input those functions explicitly at the same time as validating the new context attributes proposed by the system.

In the second operation 242, the Context Classifier 29a executes as a continuous, iterative, and potentially off-line process, i.e., it is not part of the control flow of processing a specific user query. The Context Classifier 29a applies an inductive learning algorithm to attempt to predict derived contexts. Particularly, for a particular domain, the Context Classifier 29a analyzes historical user interaction records 19 from the user records database 15 to learn how the user, the attributes and the specific values map to context attribute functions 16, i.e., the user interaction records 15 serve as a training set for the continuous improvement of the functions. This system learning may be accomplished because the user interaction records contain traces of previous interactions, including user validated contexts that were applicable during those sessions, and the users response/behaviors around those transactions. Additionally, the Context Classifier 29a considers both individual user history and that of other users with shared organization, community or environmental similarities leading to common behaviors and acceptance criteria. The output 247 of this process comprise the additions and modifications to the set of context attribute functions 16 resulting in increasing ability to predict derived contexts as functions of the raw contexts.

In the third operation 243, a Context Applier process 29b is executed on-line when the user initiates (logs-in) or refines a query to the system. Each user's current inquiry transaction has it's own set of raw contexts (as entered via the iconic interface or sensed in response to the user log-in identification). As shown in FIG. 6, these raw contexts include user context whether it be static, historical, or transient, organizational or community context, environment context, or any other context associated with the user and dependent upon that user's interaction state and query domain, e.g., education, real estate, travel, etc. The context attribute functions 16 are used to compute a specific value for each context pair, given the raw context 250 for this particular user transaction. Since the functions are constantly improving, the values computed for each context attribute for each individual user lead to improved accuracy and relevance in the search that follows.

The output of the Context Applier process 29b is the Context Vector 25' which holds all the context attributes and values relevant to this search and which is used in the ensuing resource lookup as described in greater detail herein. Importantly, this context vector is kept intact through the completion of the user search, even if later revised, so the system can learn what leads to successful and unsuccessful search conclusions as described herein.

The Context Applier process 29b is additionally invoked at each session initiation for a user's search transaction, using a minimal or null user data set to produce defaults for user context, attributes, values, and resource parameters for the initial display via the first interface described herein. This pre-processing step delivers additional benefits to the user by ensuring use of the most current data and functions operating in the system, i.e., the system will determine everything about the user and generate the most up to date context vextor before processing their actual user query. Described below with respect to FIG. 3 are representative examples of a user's interaction with the system in a variety of customer domains including education, real estate and travel. In the representative examples illustrated in FIG. 3, the context classifier will initially populate the user context vector with the context attributes and associated values according to a user, for example, in response to user log-in to the system, or subsequently, in response to initial query and context icon selection.

As the customer self service system is provided with functionality enabling a user to "bookmark" their stopping point in a prior session and to resume with a "work-in-process" data set, the initial settings may be modified based upon system discovery or user override at the time of inquiry, resulting in the raw contexts associated with the user's current inquiry transaction. It is this raw context data which serves as input to the context classifier sub-process 24.

Referring back to FIG. 1, the Adaptive Indexing of Resource Solutions and Resource Lookup sub-process 28 receives as input the user query and the context vector 25' and processes them against a Resource Library 42, the User Interaction Records for this user/user group 19, and the Resource Indexing Functions 27. This sub-process particularly maps specific contexts to specific resources so as to increase the relevance of search results for a given user in their current context without requiring the user to explicitly train the system. The primary output of the Adaptive Indexing of Resource Solutions and Resource Lookup sub-process 28 is a newly identified Resource Response Set 35 which is input to the Response Set Ordering and Annotation sub-process 34. The Adaptive Indexing of Resource Solutions and Resource Lookup sub-process 28 additionally generates a secondary output which comprises updates to the Resource Indexing Functions database 18 with yet more enhanced functions 27'. Thus, machine learning is used to develop an ever improving set of resource indexing functions without the need for the user to explicitly train the system. It should be understood that the term "Resource Indexing Functions" indicates the mapping between user queries and searchable resources. "Functions" may include, but are not limited to, the following: "rules" for data selection, resource tags, pointers or paths through specific data. Specifically, "resource indexing functions" may include inclusionary and exclusionary resource parameters and values which help narrow each search. These parameters become visible and modifiable to the user on the Detailed Specification Workspace 23 described herein with respect to FIG. 5.

Figure 7:
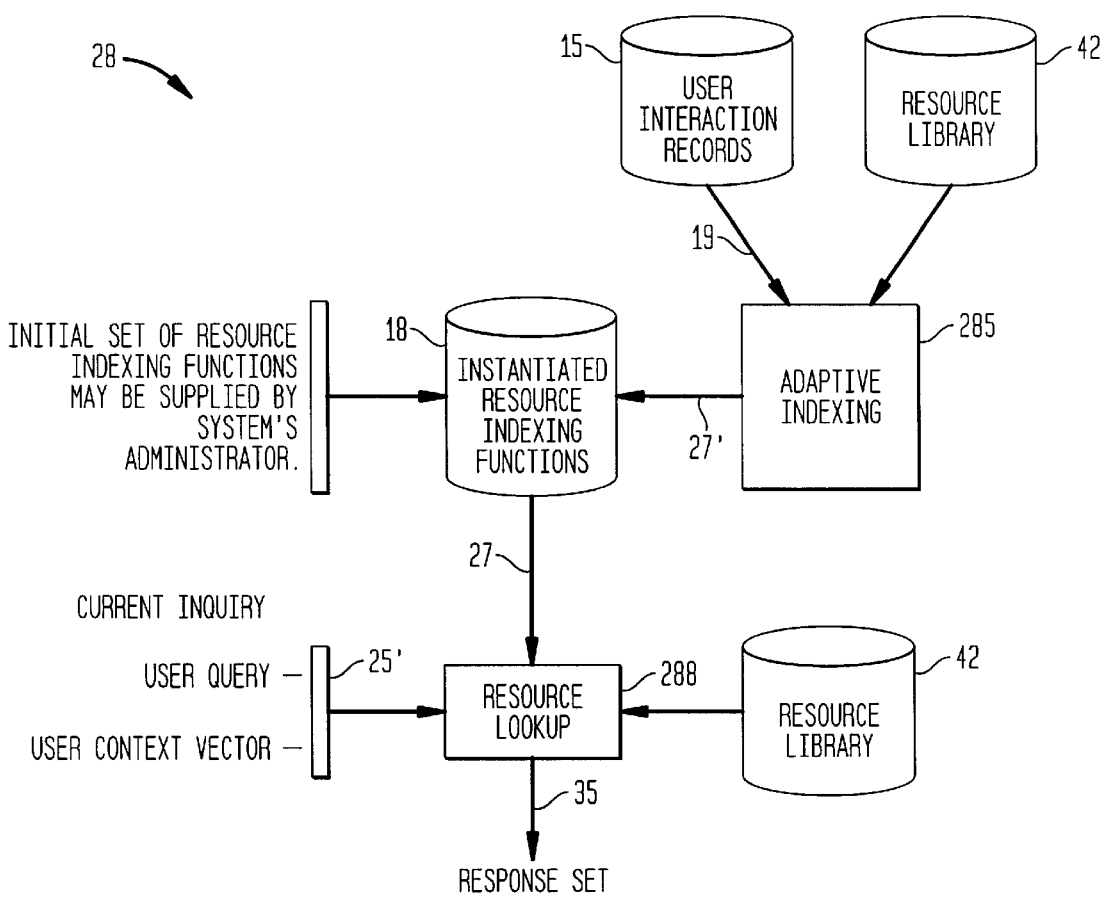
FIG. 7 is a flowchart depicting the adaptive indexing of resource solutions and resource lookup sub-process of the customer self service system of the invention.

As shown in greater detail in FIG. 7, to accomplish the task of matching a set of resources to a user's request in a given context, the Adaptive Indexing of Resource Solutions and Resource Lookup sub-process 28 comprises three asynchronous operations: a first operation for periodic data creation and maintenance of the instantiated resource indexing functions 18; a second operation that occurs frequently or continuously in the background that involves system learning from historical transactions. Both of these are prerequisite for the execution of the third operation, which is what occurs when the user initiates or refines a query to the system.

Specifically, in the first operation, the system is supplied with a "master" set of Resource Indexing Functions 18 that provide the logic for linking individual or sets of resources to a fully defined query. At system initiation, the system administrators have defined and provided in place the startup set of functions. On an ongoing basis, as will be described in greater detail with respect to FIGS. 1 and 9, a Discovery and Validation sub-process 48 applies machine learning to identify clusters of users queries and their successful response sets. These connections automatically update the Resource Indexing Functions database 18 as shown in FIG. 1. The Discovery and Validation sub-process 48 additionally enables the systems administrator to manually add or revise resource indexing functions explicitly.

Referring back to FIG. 7, in the second operation, an Adaptive Indexing algorithm 285 is implemented for execution as a continuous and/or iterative process. In this sub-process, User Interaction Records 19 serve as a training set for the Adaptive Indexing algorithm 285 to learn (and continuously improve) indexing functions 27 for selection of relevant resources from the Resource Library 42. More specifically, User Interaction Records 19 include traces of previous interactions with users of the system including: all types of raw context information, whether it be static, historical, or transient, organizational or community context, environment context, or any other context associated with the user and dependent upon that user's interaction state and query domain, e.g., education, real estate, travel, etc. user queries, the system's responses, and user feedback. (Feedback, for example, could be a specification of which resources were chosen or rejected by the user given a list of displayed resources.) The Adaptive Indexing algorithm 285 optimizes the performance of Resource Indexing Functions 27 as measured by the feedback in the User Interaction Records 19. For example, one measure of performance is the coverage of the resources eventually selected by a user given a query/context pair. In this case, an indexing function has high performance if the result set it suggests often includes all the resources selected by the user.

Preferably, the adaptive indexing algorithm 285, is an offline process, employed to try out several rules against an amount, e.g., a months worth, of User Interaction Records 19, for example, and output the best Instantiated Resource Indexing Functions (rules) 27' that may be used in processing specific queries via a Resource Lookup sub-process 288. This supervised learning system knows the right answer—which resources the users eventually selected over time from those presented—and the system considers possible rules to predict the selection. For example, suppose there were three possible rules: a first Rule 1 that would have predicted the response set that the users eventually selected 75% of the time; a second Rule 2 that would have predicted the response set that the users eventually selected only 55% of the time; and a third Rule 3 that would have predicted the response set that the users eventually selected 75% of the time, but would have predicted a smaller response set. Then the Rule 3 would be considered a better rule than Rule 1.

Adaptive Indexing makes inferences and draws conclusions regarding the individual user's preferred resource characteristics, groups of user preferred characteristics, and about the resources themselves. Particularly, Adaptive Indexing 285 is an adaptive, supervised learning algorithm (supervised because it's using past User Interaction Records and adaptive because it will modify its outputs over time as it learns) that adapts a weighting function on the attributes associated with the resources. For example, each user context includes a cost attribute and value. Each resource also has a cost attribute and a specific value. In an example scenario in which all the resources are so inexpensive that the poorest users (those whose cost attribute in their user context has a low value meaning they have little money to spend) can afford to select the most expensive resources, then the adaptive indexing algorithm would learn to downgrade the importance of the cost attribute in the weighting of the various attributes which is passed by the Adaptive Indexing algorithm 285 to the Instantiated Resource Indexing Functions database 18 for use by the Resource Lookup function 288 to select the Response Set 35 in response to a specific user query. In a different example the cost attribute may be much more important in determining which resources should be included in the response set and so, by giving the cost attribute a higher weight in Instantiated Resource Indexing Functions 27—expensive resources would be excluded when the Resource Lookup function 288 processes the user query with the user context vector containing the cost attribute and value indicating a sensitivity to cost.

Ultimately, Adaptive Indexing increases the value of search results for a given user in their current context by creating functions of increasing relevance and specificity. This Adaptive Indexing process 285 may be done offline. Logically, it may additionally execute on-line, gaining some advantage in currency of data, however this implementation would likely involve some additional cost in system resources or performance.

In the third operation, a Resource Lookup sub-process 288 is executed interactively whenever the user initiates or refines a query. In this, the User Query and the User Context Vector 25', the latter developed in the Context Classification sub-process 24 described herein, are both processed by the Resource Lookup process 288 against the Instantiated Indexing Functions 27. Resource maps are used to select a subset of resources that are relevant to the user's query from the Resource Library 42 and to create the resource Response Set 35. More particularly, the Resource Lookup sub-process 288 implements a function (rule) that computes a subset of the resources by scoring all the resources and generating a response set. Each resource has associated different attributes (cost, etc.). The input user context vector 25' indicates which attributes are relevant, for example, for cost, expertise level, etc. and their values. The input user query terms additionally match up with the resources in the response set 35 output by the Resource Lookup 288. It's not enough just to match on the basis of the context vector so the selected resources are correct from the point of view of cost and expertise level.

While the primary design objective of the current invention is to deliver the most relevant resource results to the users, the pre-processing to develop the indexing functions has two other advantages: First, the system will operate more efficiently, finding it's way to preselected resources, seeking resource sets that are used more frequently by more users. Secondly, the system will be able to perform better for the user: response time must be shorter if the search time is less.

The output of the Resource Lookup sub-process 288 is the Response Set 35, a set of records describing the selected resources. This set of resources will be further processed before presentation to the user in subsequent steps of the overall query process as described herein. Importantly, this response set is kept intact through the completion of the user query, even if later revised, so the system may learn about what leads to successful and unsuccessful search conclusions.

Referring back to FIG. 1, the Response Set Ordering and Annotation sub-process 34 receives as input the User Context Vector and Resource Response Set 35 and processes it against data from an Annotation Scoring Metric database 46 and User Interaction Records 19 for the particular user/group. This sub-process 34 weights and ranks the potential responses according to the resource selection criteria specified by the user on the Detailed Specification Workspace described herein, and takes into consideration the scoring metric. The sub-process 34 additionally tags the response set with data elements necessary for display and manipulation on a visualization system, including, but not limited to, the Results Display Workspace 32 described herein, and particularly generates as output an Annotated Resource Response Set 38.

Figure 8:
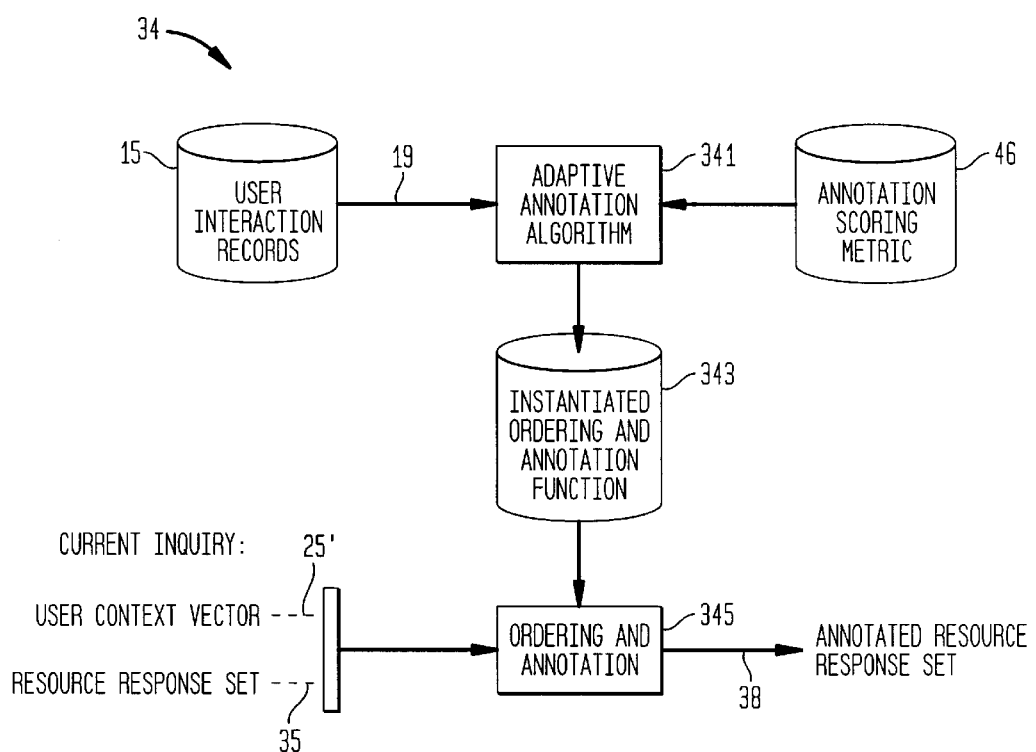
FIG. 8 is a flowchart depicting the adaptive response set ordering and annotation sub-process of the customer self service system of the invention.

More particularly, FIG. 8 is a flowchart depicting the response ordering and annotation sub-process methodology 34 for ordering a result set according to the preferred embodiment of the invention. As shown in FIG. 8, the User Interaction Records 19 (which include the actual resources selected by the users and the annotation schemes used to present them) and the Annotation Scoring Metric 46 are input to an Adaptive Annotation Algorithm 341 which is a supervised learning algorithm that generates functions or rules for optimally annotating the response set for ease of use as defined by the Annotation Scoring Metric. User Interaction Records 15 particularly comprises traces of previous interactions with users of the system including: all types of raw context information that were available during those interactions, whether it be static, historical, or transient, organizational or community context, environment context, or any other context associated with the user and dependent upon that user's interaction state and query domain, e.g., education, real estate, travel, etc. user queries, the system's responses, and, in addition, user feedback generated by the user regarding the resources that were provided during those sessions. User feedback, for example, may include a specification of which resource was chosen by the user given a list of displayed resources. The Annotation Scoring Metric 46, for example, may include a parameter representing the measure of "goodness" in terms of how easily the user may find the resources in the response set 35. As another example, the Annotation Scoring Metric 46 may be set up to penalize an annotation which does not make it "easy" for the user to find the resources in the response set, i.e., a metric that places most of the resources ultimately selected by the user on a second screen on the user interface or at the bottom of the first screen. As another example, one measure of performance is closeness of the selected items to the top of the response set (assuming that the annotations of the response set specify an ordering of the response set).

Each of the user interaction records and annotation metric serves as a training set for learning an ordering and annotation function 343. That is, the adaptive annotation algorithm 341 is implemented to optimize the annotation function 343 as measured by the feedback in the received interaction records 19. That is, the annotation function 343 accepts an annotated list of resources, along with the user interaction records associated with the interactions that happened when this annotated list was presented to the user and returns a real value representing the performance of that annotation. For example, an annotation evaluation metric of a score computed by counting how far down from the top of the list was the user's selection given the annotation. Thus, according to this metric, a given annotation set would get the highest possible score if it had placed the resource eventually selected by the user at the top of the list of resources presented to the user. It should be understood that this adaptive process 341 need not be interactive, but may be performed in batch or off-line.

The sub-process methodology 34 further includes an ordering annotation step 345, during which the ordering and annotation function 343 which comprises the rules to be used in mapping the user context vector 25' with the resource response set 35 in order to generate an annotated response set 38. It is understood that the ordering and Annotation step 345 is executed interactively, e.g., at the time of every user query. It is the application of the ordering and annotation function 343 to the user context 25' and resource response set 35 that result in the annotations 38 for the responses in the input response set, which annotations control the presentation of the resources to the user. As an example, these annotations may include ordering, which resources to bold, which would be placed on the primary screen of query results seen by the user and which would be placed on a secondary screen requiring an additional step by the user such as clicking on a button "give me additional resources", which resources to gray out, etc.

As mentioned, the ordered and annotated set of resources that the system has found to best match the user's initial query and related subject and context variables may be displayed through any visualization system, including, but not limited to, the intuitive iconic interface 32 for visualizing and exploring the response set. In that case, the annotations 38 specifically are used to inform the iconic user interface 32 what resources to display in response to the query and how to display them. Particularly, as will be described in detail herein with respect to FIG. 10, the Results Display Workspace 33 provides an interface that enables the user to continue working to learn about the resources suggested (detail/preview), narrow their results (selection) or redisplay them in a more meaningful view for decision making (graphically). In most instances, that will suffice. However, should the user wish to further refine their query, tune or override their current or default settings, that option is also available by navigating back to the Detailed Specification Workspace interface 22. If the user needs to start over, including selection of a new user context, it will be necessary to navigate back to the initial Context Selection Workspace 13.

As the user works with the system, particularly through the Results Display Workspace 32 and the Detail Specification Workspace 22 his/her interactions are captured and stored in the User Interaction Records database 15. Thus, in addition to the user query, context vector and response data set, the system retains adjustments to user context, results display manipulation, and results viewing and selection behavior 51.

Having completed the transaction, there is one more sub-process which is essential to this system: the sub-process for Context Cluster Discovery and Validation 48. This batch process, occurring asynchronously and constantly, applies unsupervised (machine) learning to cluster user interaction records and to assist in the identification of new user contexts, attribute value functions and resource indexing functions. The User Interaction Records 19 are processed against the Context Attributes Master database 14, the Attribute Value Functions database 16 and the Resource Indexing Functions database 18 and a Distance Metric 44 which helps determine "how close is close", i.e., "what's good enough" for a variety of factors. When validated by a systems administrator, additional user contexts may be implemented (manually or semi-automatically) in the databases and visibly as new icons on the Context Selection Workspace 13.

Particularly, the Context Cluster Discovery and Validation sub-process 48 periodically analyzes user interaction records 19 of User Interaction Records database 15, documents its "discoveries" of user interaction "clusters", and presents them to a systems administrator tool for consideration. Clustering, in machine learning terminology, refers to the grouping of data based upon the frequency of occurrence within the data itself, as opposed to the classification of data based upon previously established examples.

Figure 9:
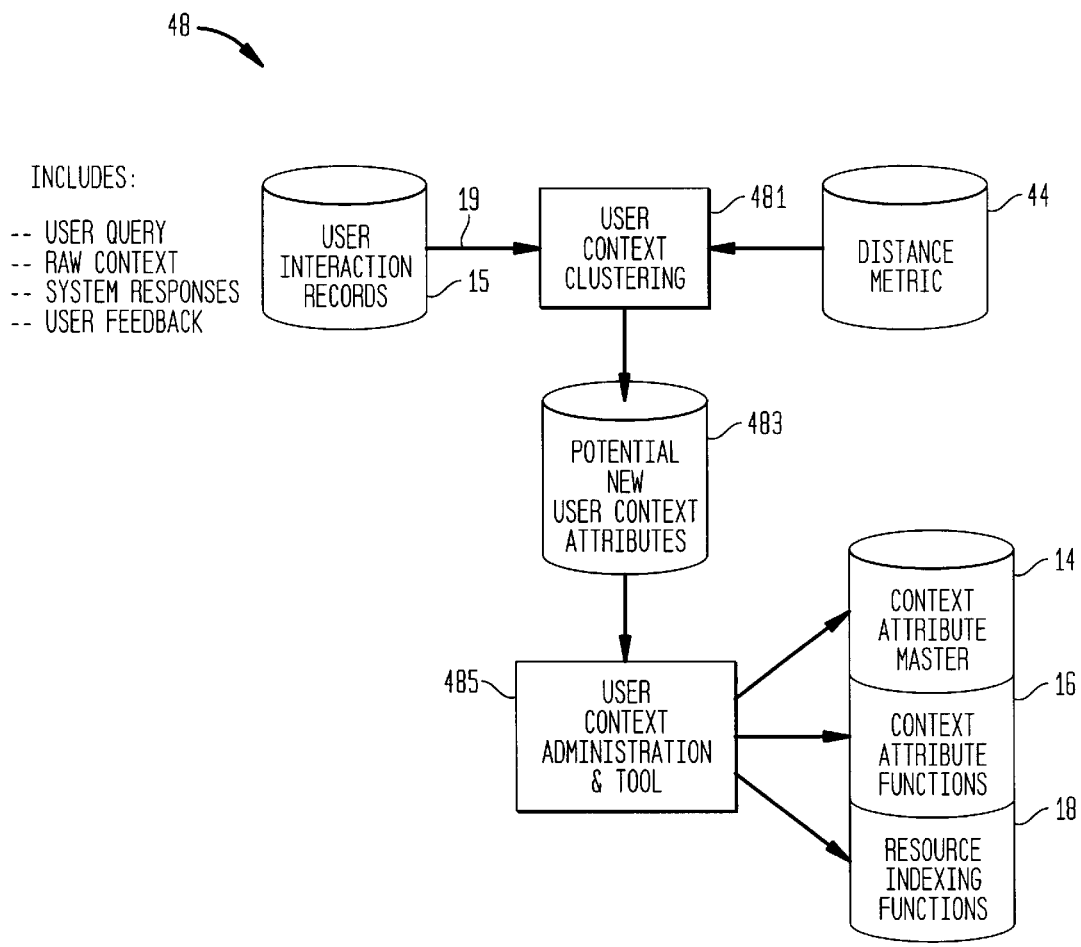
FIG. 9 is a flowchart depicting the Context Cluster Discovery and Validation sub-process of the customer self service system of the invention.

FIG. 9 depicts the overall process of discovering, and validating new user context terms. In a first step of the process, a user context clustering process 481 receives user interaction records 19 that include traces of previous interactions with users of the system including: all types of raw context information, whether it be static, historical, or transient, organizational or community context, environment context, or any other context associated with the user and dependent upon that user's interaction state and query domain, e.g., education, real estate, travel, etc. user queries, the system's responses, and user feedback. It is understood that user interaction records 15 are captured at several points in the overall system: For example, the context vector is captured initially, along with identifying information about the user, time and source location of the query. The annotated response set is captured after the ordering step during the query, along with transaction identifying information linking it to the initial context vector and any revised context vectors generated before this transaction is completed. The user's entries and overrides through the iconic interfaces to the system are captured when interfacing with the system via the Context Selection Workspace 13 of iconic interface 12 and, the Detailed Specification Workspace 23 of iconic interface 22, and users' cursor movements and actions taken are captured during resource display, preview and selection. Implementing a well-known unsupervised clustering algorithm, the process 481 clusters these interaction records according to an externally specified distance metric 44 which defines how similar two user interactions are. For example, the clustering may focus on how similar the result sets are given that this is the part of the user interaction that contexts are being used to predict. Similarity of other aspects of the user's interaction, for example, bandwidth of user's connection might be an aspect of the user's raw context that might be relevant to clustering user interactions as well. Thus, the distance metric 44 measures distance with respect to all of these parameters of the user interaction records.

The output of the clustering process 481 is a set of potential new context attributes 483 with each potential attribute comprising a set of related user interactions. A user context administration tool 485 provides an interface, such as a browser, for enabling a human administrator to view these sets and, when appropriate, to create new context attribute names and associated attribute values in the Context Attributes Master database 14. These context attributes and values serve as training data for the context classifier sub-process as described herein. The next time the classification of user contexts is executed, the system will find the newly created context attributes and their associated values, and identify and codify the associated data, including that for the current transaction, that which updates context functions, and that which will be captured in user interaction records from that point forward. All of these additional classifications improve the ease of use, accuracy, and predictability of the system over time.

In addition, the User Context Administration tool 485 may be used, optionally, by the administrator to update the Context Attribute Functions 16 (i.e., those rules, formulae or neural nets, etc., providing ways of inferring attribute values automatically) and the Resource Indexing Functions 18 (i.e., those rules, formulae, neural nets, indexes, etc. providing automatic linkage of resources to a specific query). Without explicit human intervention using this tool, the system will ultimately discover the functions that serve the user population. But in some uses of this system, there may be advantages in start-up accuracy, learning efficiency, or policy enablement to providing some "rules" to the system.

The customer self-service system and the interaction with the system through the iconic interfaces of the invention, will be described with respect to example domains such as education, travel and real estate, and further will be described from the point of view of the following users: a learner, a traveler and a real estate transactor, e.g., renter/buyer. In describing the user's interaction with the system through the iconic interfaces, a set of data elements used in the system and their characteristics are first defined as follows:

Query: an entry field for entering search data by using text or voice methods, for example, but not limited to these methods User Context: a User Context represents a predefined set of context attributes which are relevant to the search behavior/needs of a group of people.

More particularly, the User Context enables the packaging of a rich set of attributes about the user with a rich set of attributes about their searching and execution environment in response to "one click" of an icon for the user presented via the interface. While there are potentially a large number of potential user contexts for any user population, each individual user would likely settle on a small number that apply to them in different circumstances. The naming of these contexts is important so that the user may recognize him/herself as potentially fitting into that group. The attributes associated with a particular user context are predefined by system administration and cannot be modified by the user. Over time, the system will identify changes to the attribute set that will make a particular user context perform better for its repeated users. Over time the system will detect different attribute sets which appear to predict user needs/behaviors and might suggest new user contexts for the system.

Context Attribute: An attribute is used to describe a characteristic associated with the User Context.

There are potentially an unlimited number of attributes defined to the system with a master list maintained in the Context Attributes Master File. New attributes are discovered and added with system administrator validation. End users may not modify the definition of a context attribute, nor its' packaging into user contexts, nor the list of values associated with each.

Attribute Value: A list of attribute value choices is predefined for each context attribute.

The system sets a default value to each attribute based upon data lookup, sensed, or historically derived from prior user entry or behavior. Either the system or the user may modify the value initially set based upon explicit preferences or observed behavior. This value is added to the context vector used for resource lookup, and is retained in the historical User Interaction Records database 15 so it may be used to set default values for each individual each time they use the system.

Value Resource Parameters: Parameters defined in terms of inclusion and exclusion that may be used as a filter to increase the relevance of the response set.

That is, with the basic search logic established, the user's query may be satisfied. However, the response set may contain a large number of resources which are not satisfactory to this individual. Value Resource Parameters defined in terms of inclusion and exclusion may be used as a filter to increase the relevance of the response set. The inclusionary parameters may be easier to establish by users new to the system and that exclusionary parameters will become more evident as users gain experience in working with the response sets.

Resource Selection Criteria and

Value Ranges: Parameters and specifications for ranking a user's response set to enable more informed resource selection.

Thus, even with the degree of specificity enabled by the system, and even with the constant improvement in search relevance/efficiency as it relates to user contexts, there usually may be more than one resource to present to the user (in fact, if the search is too narrow, the user may miss the opportunity to explore/discover different approaches to meeting their actual needs). As most users know (or think they know) the criteria they will apply to selecting between options, a limited set of resource selection criteria are provided by the system (the set would differ by domain). However, via an interactive graphical display provided by the iconic interface of the invention, the user may now specify acceptable value ranges and relative weighting of each criteria for ranking their response set and/or may customize the use of these criteria.

When the actual response set data is offered, most users face the reality of many options, few options, more subjective information about specific resources; and they may make tradeoffs around the selection logic. For example, the response set may be refreshed as the user may decide to eliminate a criteria, change the weight of a criteria, or change the acceptable value ranges for a criteria. From these specifications, accessible via the iconic interface of the invention, the user may determine for example, whether time, timing, flexibility, and risk may be sacrificed in order to bring the cost down below a certain dollar ($) value, and, for example, determine how much more would the user need to pay to get exactly what he/she wants exactly when he/she wants it.

FIGS. 2, 4, 5 and 10 depict in greater detail the iconic interfaces for the customer self service system that enable the use of a rich set of assumed, sensed, inferred, and derived contexts with minimal user effort.

With initial logon, as shown in FIG. 2, the system first presents a set of user contexts which are available to the user via the simplified iconic interface 12 of FIG. 2. The system will suggest one context over the others, but the user may select the one most appropriate to their current situation. In each session, the user selects only one user context to use, however over time each user may discover that a couple of different user contexts serve their needs in differing circumstances. On this screen 13 particularly, the user then enters a query via one or more methods including text via a web browser display interface, for example, or via voice, for example, with help of voice recognition software. It should be understood however, that query entry is not limited to these types of methods. The user will then initiate a lookup and proceed either to a third process step (via most direct path 52) for viewing a search result response set via the Results Display Workspace interface 32, or, proceed to a second step (via path 50) to optionally refine/override search variables via the Detail Specification Workspace interface 22.

Figure 4:
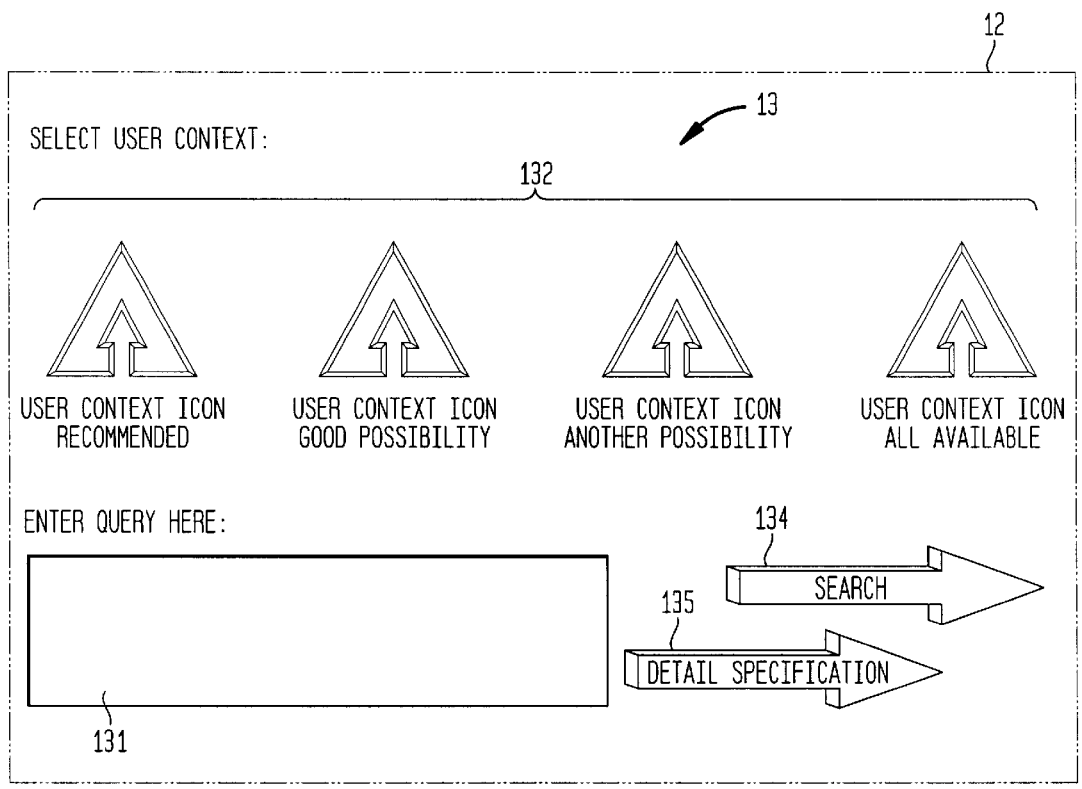
FIG. 4 illustrates the first iconic Graphical User Interface 12 including the Context Selection Workspace 13.

FIG. 4 illustrates in detail the first graphical user interface 12 including the initial Context Selection Workspace 13 that enables the expression of user context as part of a query. As shown in FIG. 4, the Context Selection Workspace 13 includes: a series of one or more selectable User Context Icons 132 presented to the user for selecting user contexts; and, a Query Entry Field 131 enabling user entry of search terms via text or voice entry, for example. In accordance with the principles of the invention, the User Context Icons 132 are graphical user interface elements from which the user selects the one context most representative of his/her current situation. The icons presented in this interface each represent a packaging of sets of attribute-value pairs which describe a kind of user in a particular situation. Particularly, a user context represents a predefined set of context attributes which are relevant to the search behavior/needs of a group of users. For example, as described herein, context may include aspects of the user's knowledge, their relationship to organizations and/or communities, their user environment(s), and their resource need. All of these combine to provide a rich context surrounding the actual query which can significantly improve the outcome of the search through resources.

The Context Selection Workspace 13 thus enables the expression of user context as part of the query and is optimized for ease of use. Particularly, the user selects from one or more of the several displayed context icons 132 by clicking on them. A context "applier" pre-process is invoked at each session initiation for a user's search transaction, using a minimal or null user data set to produce defaults for user context, attributes, values, and resource parameters for the initial display of the Context Selection Workspace 13. This pre-processing step delivers additional benefits to the user by ensuring the use of the most current data and functions operating in the system. After making the initial query entry, by selecting hyperlink 134, the user is able to initiate the search and proceed directly to the third interface 32 which displays the actual search results. Alternately, by selecting hyperlink 135, the user may proceed to the second interface 22 having the Detail Specification Workspace 23 for further query editing and/or context refinement.

Returning to FIG. 2, with respect to the second step, the user is able to fine tune or override context attribute values, value resource parameters, and resource selection criteria and value ranges, using a drag and drop interface, iconic pulldowns, and/or slide buttons. The user may return to this screen as many times as needed to find a suitable response set. Particularly, via the second iconic interface 22, the User Context selected in the first step has been made explicit by its default settings on all the iconic interface elements listed. Thus, via a Detail Specification Workspace 23 the user may: 1) modify the query (via text entry or voice, for example); 2) change the value of attributes associated with the user context (using pull down menus); alter the value resource parameters (e.g., include/exclude) using checkboxes; 3) customize the subset of responses by altering the resource selection criteria, including the weighting of criteria and the ordering of criteria on the final display, (e.g., using checkbox and/or numeric entry); and, 4) further refine the selection by specifying minimum/maximum acceptable value ranges for resource selection criteria through drag and drop of "tabs" on sliders, for example. After making the necessary adjustment, the user re-initiates the lookup and may proceed to the third step via path 51.

Figure 5:
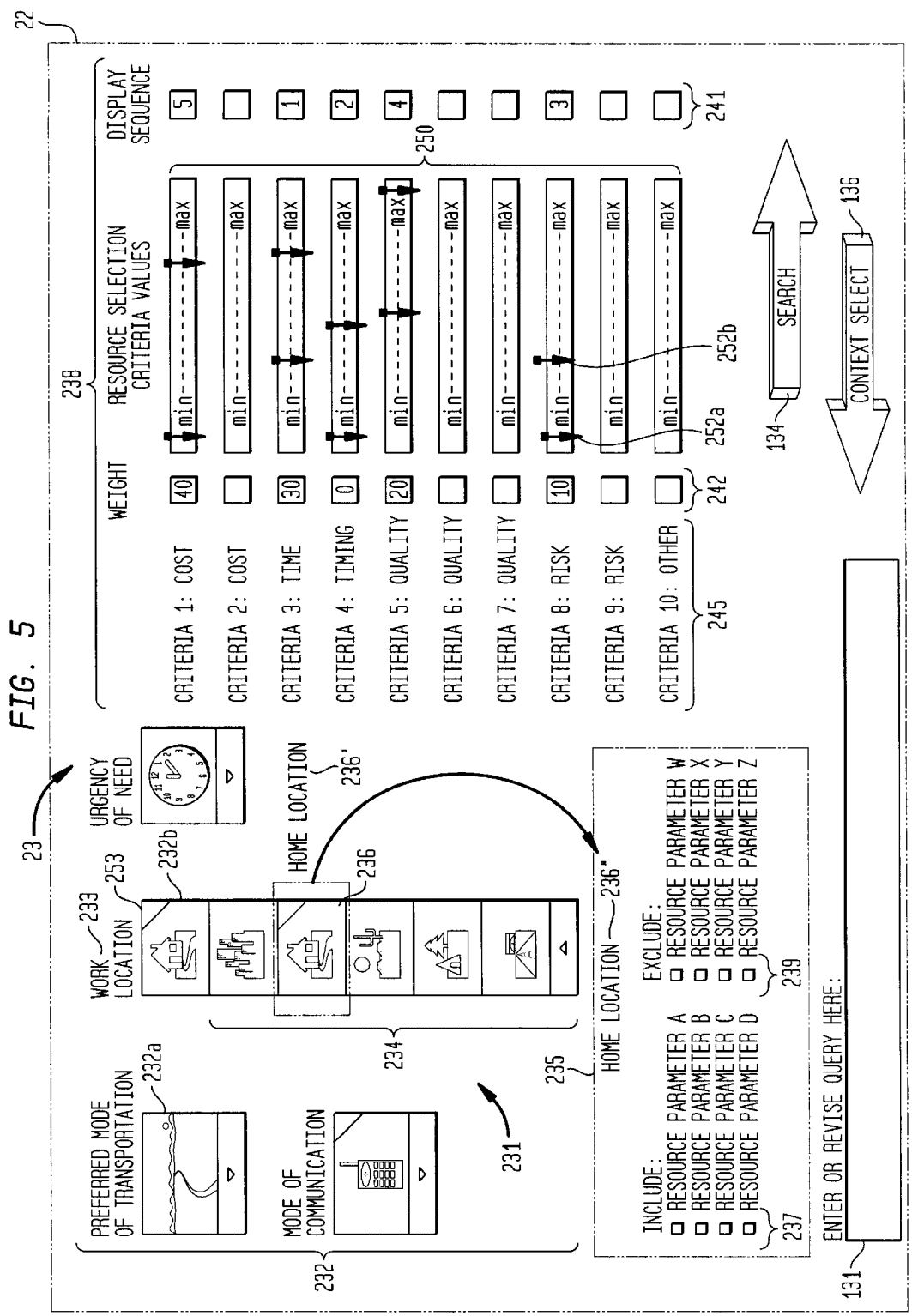
FIG. 5 illustrates the second iconic Graphical User Interface 22 including the Detail Specification Workspace 23.

FIG. 5 illustrates in detail aspects of the second iconic graphical user interface 22 which enables the user to define or change all the parameters associated with their query 131 and (single) selected user context 132. As shown in FIG. 5, the graphical user interface 22 is divided into the following sections: a section for displaying the Query Entry field 131 as entered on the prior interface screen (FIG. 4) and available for editing; a section for displaying navigation arrows which allow the user to proceed with the search 134, or return to the initial Context Selection screen 136 via the first iconic interface to initiate a new query or select a different user context; and, a Detailed Specification Workspace 23 which is where all the search parameters can be explicitly viewed and modified. There are only two things the user cannot change from this screen: the user context selected (which they may change only on the Context Selection screen) and the context attributes which are linked to the user context (and which are predefined in the Context Attributes Master database 14).

As shown in FIG. 5, within the Detailed Specification Workspace 23 there comprises: an Attribute-Value Workspace 231, for enabling the user to change the attribute values for all the context attributes, represented as graphic elements 232, associated with the selected user context icon 132 (FIG. 4); and, a Resource Selection Criteria Workspace 238, for enabling the user to define the criteria 245 to be used in evaluating resources, define minimum and maximum acceptable values provided on slider elements 250 corresponding to each criteria, specify the weight assigned to those criteria via selection boxes 242, and specify the positioning of those criteria in a graphical display of the resources selected via selection boxes 241. As will be described, FIG. 3 provides sample data for the context attribute, attribute value, value resource parameters, and partial resource selection criteria from different domains which may be represented in the Detailed Specification Workspace 23.

With more particularity, the Detailed Specification Workspace 23 additionally includes the Value-Resource Parameter Workspace 235, for enabling the user to change or create resource parameters using include logic 237 or exclude logic 239 for any attribute value 232 selected in the Attribute-Value Workspace 231. More specifically, the Attribute-Value Workspace 231 includes graphical representations of all the context attributes 232 associated with the single (currently active) selected user context 132. Each context attribute 232 is displayed with a text title 233 for the attribute. The currently active attribute value for that context attribute is shown on each context attribute icon. In addition, if the user has substituted, as described below, a context attribute value different than the default value provided for this user session, a marker 253 is displayed on the corner of the context attribute icon. If the user "mouse clicks" on the context attribute element, e.g., icon 232*b*, the system displays a pull down menu 234 of graphic elements showing all the possible attribute values for this context attribute. If the user "mouses over" any of the values from pull down menu 234, e.g., attribute value 236, a textual description 236' supporting the element may appear. By selecting a context attribute element from the pull down menu 234, e.g., element 236 shown highlighted in FIG. 5, the user is enabled to fine tune their selected context based upon their current situation. If the user "mouse clicks" on a value other than the current default, the new value is "selected" to substitute for the default. If the user "double clicks" on the attribute value, the system prepares the Value-Resource Parameter Workspace 235 for this single attribute value, as will be described. FIG. 3 provides sample data for context attributes and attribute values from different domains which may be represented in the Attribute Value Workspace 231.

In the Value-Resource Parameter Workspace 235, the user may change or create resource parameters using include logic or exclude logic for any context attribute value 232 selected in the workspace 231. Regarding FIG. 5, with more particularity, the Value-Resource Parameter Workspace 235 is displayed for one attribute value at a time and is only displayed when requested via a double click, for example, on one of the attribute values displayed in the attribute Value Workspace 231, e.g., attribute value 236. The Value-Resource Parameter Workspace 235 is a pre-formatted two-column space (dialog box) where the user may establish inclusionary resource filters via checkboxes 237 and/or exclusionary resource filters via checkboxes 239, based upon pre-established resource characteristics 236" for that selected attribute value. The value resource parameter data elements are pre-set by the user's know context, prior history of selecting from resources identified by the system, and potentially by corporate/organizational policy implemented through the system. By making these additional specifications, the user is enabled to increase the relevance of the resource response set based upon their current situation and personal preferences. When finished with these specifications, the user may double click to close this box 235 and return to the Attribute Value Workspace 231. This step can be repeated for as many attribute values as the user would like to refine and may be executed either before or after the search is conducted. Value resource parameter data elements associated with context attributes for different domains, are provided in FIG. 3 as samples of data which may be represented in this Value-Resource Parameter Workspace 235.

Regarding FIG. 5, with more particularity, the Resource Selection Criteria Workspace 238 includes a list of criteria 245 which may be used in evaluating resources. This list, provided by the system, is customized by domain; but in all domains, it involves criteria including, but not limited to issues such as: cost, time, timing, quality and risk associated with using a particular resource to satisfy the user's specific need. The initial system default might be to use all criteria and weight them equally. Over time, however, the default criteria may be set by the system based upon user context, user prior transaction history and user behavior on prior searches. If the user wishes to further reduce the set of criteria, they may do so by assigning a weight, for example a percentage weight, to each criteria they want used in the entry boxes 242. Along with each of the criteria selected there exists a range of acceptable values specified on an associated individual slider element 250. The initial system default, may be "unlimited" and then, may be set over time based upon user context, use and behavior. Additionally, the user may use drag and drop tabs 252a,b on the slider element 250 to set a minimum and/or maximum value for the associated resource selection criteria. It is understood that the unit of measure on the sliders may vary by criteria. Further, via entry boxes 241, the user may select to view via "check" or specify via number entry the display sequence of these criteria when arrayed as the axes on an n-dimensional graphic display provided in the Results Display Workspace via graphic interface 32 as described in greater detail herein.

The Detailed Specification Workspace 23 thus provides full disclosure of system defaults and enables the user to completely manage their search.

As mentioned, the ordered and annotated set of resources that the system has found to best match the user's initial query and related subject and context variables may be displayed through a number of interfaces including, but not limited to, the intuitive iconic interface 32 for visualizing and exploring the response set. The annotations 38 specifically are used to inform the iconic user interface 32 (FIG. 2) what resources to display in response to the query and how to display them.

Figure 10:
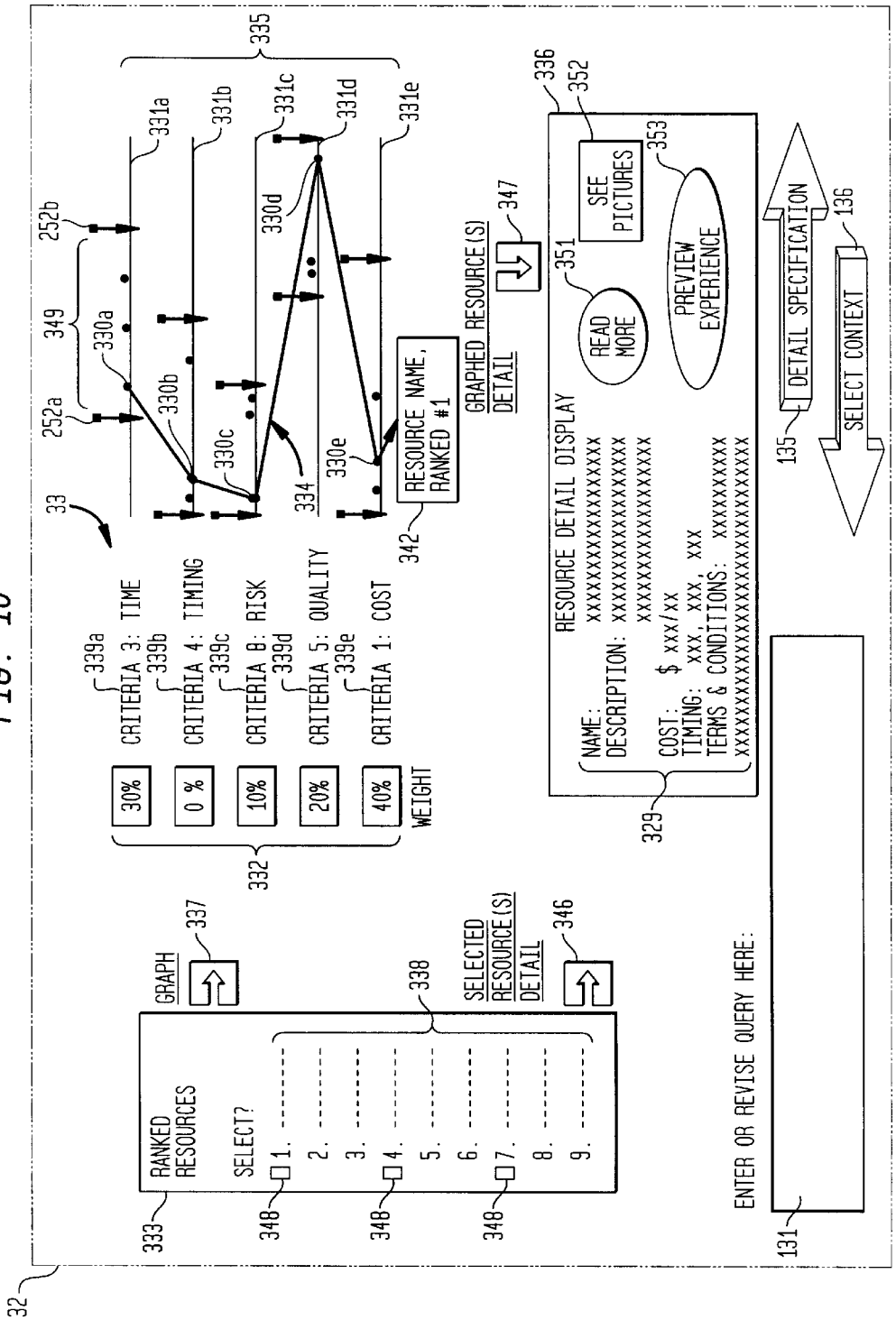
FIG. 10 illustrates in detail the third iconic Graphical User Interface 32 including a Results Display Workspace 33 that enables the user to visualize and explore the resource response set.

FIG. 10 illustrates in detail the third iconic graphical user interface 32. As shown in FIG. 10, the graphical user interface 32 is divided into the following sections: a section for displaying the Query Entry field 131 as entered on the prior interface screen (FIG. 4) and available for editing; a section for displaying a navigation arrow 135 for enabling the user to proceed back to the Detailed specification Workspace 23 of FIG. 5, and arrow 136 for returning to the initial Context Selection screen via the first iconic interface to initiate a new query or select a different user context; and, a Results Display Workspace 33 that enables the user to visualize and explore the response set that the system has found to best match the user's initial query and related subject and context variables and that enables the user to continue working to learn about the resources suggested (detail/preview), narrow their results (selection) or re-display them in a more meaningful view for decision making (graphically).

The Results Display Workspace 33 particularly includes a graphic element 333 which comprises a list of ranked resources 338 returned by the user's query. Via this graphic element, the user is provided with ability to select via checkboxes 348, for example, one or more resources for viewing of additional details. The response set 338 is ranked by the aggregate value and weighting defined by resource selection criteria and value ranges as described herein.

As shown in FIG. 10, the Results Display Workspace 33 displays the weighting 332 for each of the available resource selection criteria 339a, . . . ,339e. The choices of weighting and selection of resource selection criteria are made on the Detail Specification Workspace described generally herein with respect to FIG. 5. Preferably, the system generates for display in the Results Display Workspace 33 a multidimensional plot 335 comprising one or more axes, e.g., 331a, . . . ,331e, with each axis corresponding to each previously specified results selection criterion such as cost 339e, time 339a, timing 339b, quality 339d and risk 339c. The plot is initiated in response to user selection of graph icon 337, and the user's selection of one or more resources 338 from the displayed list 333 of ranked resources. Each axis 331a, . . . ,331e is displayed in the sequence specified by the user in the detail specification workspace 23 and includes one or more data points 349 corresponding to each resource 348 selected from the list 333. Each data point represents the value of the particular resource selection criteria represented by the axis for that resource. As the user moves his/her mouse over a data point resource on one of the axes 331a, . . . ,331e, for example, data point 330a on axis 331a in FIG. 10, the resource represented by that data point is visually connected, e.g., by line 334, to all the other points for that same resource, e.g., points 330b–330e. Additionally, in response to such showing, the values for all the resource selection criteria and name and rank of the resource 342 is displayed. It is understood that the locations of the data points 349 on each axis reside between the minimum and maximum resource selection criteria values indicated by the slider bars 252a, 252b as previously set by the user in the detailed specification workspace 23 of FIG. 5.

The interface 32 is additionally provisioned with an icon 346 selectable for initiating the display of a Resource Detail Display portion 336 shown in FIG. 10, which is a graphical element used to provide further details or previews of the resources 338 selected from the list of ranked resources 333. Besides providing a text description 329 of the resource, including name, cost, timing, and terms and conditions, the graphical element 336 may be provided with hyperlinks 351–353 enabling the user to read more details regarding the resource, see pictures of the resource, or preview the resource, respectively. It should be understood that icon 337 for viewing the graph or the icon 346 for viewing detailed descriptions of the actual resources are independently selectable.

As further shown in FIG. 10, the user has the additional option 347 to view a detailed description of a currently plotted resource highlighted or shown in the graphic portion 335. The detailed description of a currently plotted resource is displayed via the Resource Detail Display portion 336.

Thus, with respect to the third step, a display of the annotated response set is provided in a form ready for preview or selection. The user may rework this screen as many times as needed to better understand and make decisions about resource(s) to use. More particularly, via the results display workspace interface 32 the user may: 1) view the response set, ranked by the aggregate value and weighting as defined by resource selection criteria and value ranges; 2) select one or many of the ranked responses for graphical display in multi-dimensions along the multiple axes of the resource selection criteria; and, 3) initiate a "roll over" of one or more resources from either the ranked list or the graphical display to view detailed descriptions or to "preview" the resource. If there are too many responses, too few, or if they are incorrect, the user may return to the second step to further refine/redefine, and re-execute the lookup. Alternately, the user may return to the first step to choose a different context for their search.

While the system is intended to operate on a fully enabled graphic workstation or personal computer, it is intended that search definition and the results visualization processes described herein with respect to FIGS. 4, 5 and 10 may be operated by users of reduced graphics-enabled devices such as text screen workstations, Organizers, or any type of Personal Digital Assistants (PDAs). Accordingly, in alternative embodiments, all the context icons may have names, all the graphical displays may be reduced to lists, all the pull downs may be viewed as indented lists or secondary screens, and all the min-max sliders may convert to fill-in boxes. Further, as mentioned, the customer self service system described herein is applicable to many applications including the domains of education, real estate, and travel. The generic process flow described with respect to FIG. 2, will now be described with specific examples from the education, real estate and travel domains as shown in FIG. 3.

With respect to the education domain, the user is a learner and FIG. 3 depicts an example interaction with the system through the iconic interfaces (FIG. 2) included in the embodiment of the invention as applied to the education domain. The three iconic workspaces of FIG. 2 enable the learner to specify example data elements, such as the example data elements depicted in the Education (e.g., Environmental) column 60 of FIG. 3, and view results, as follows: In the first process step, the learner uses the Context Selection Workspace (interface 12 of FIG. 4) to specify their query 61 as "Learn Lotus Notes at home." The learner may select the User Context "Remote Staffie", for example (where the icon's name is highlighted in FIG. 3), from among the available set of context icons 62. The learner may then elect to go to the Detail Specification Workspace (interface 22 of FIG. 5) in the second process step in order to view the context attributes 63 associated with the "Remote Staffie" User Context. Preferably, the default assigned context attribute value ("DSL", for example) for any context attribute ("Connectivity", for example) is visible on the context attribute icon ("Connectivity", for example, whose name is shown highlighted in FIG. 3). The learner may click on the context attribute "Connectivity" to see the menu of associated attribute values 64. The learner, for example, may select the "Disconnected" attribute value shown highlighted in FIG. 3. By double clicking on this attribute value the list of Value Resource Parameters, i.e., include/exclude filters 65, for the attribute value "Disconnected" is displayed. The learner, for example, may indicate that they want to include download and play resources and exclude online collaborative resources when searching for relevant resources. The learner may additionally specify resource priorities 66 by selecting, sequencing and weighting and specifying minimum and maximum values for relevant criteria such as cost, time, quality and risk on the Resource Selection Criteria Definition graphical user interface element on the Detail Specification Workspace (interface 22 of FIG. 5). In the third step of the process, the results of the learner's search are listed in the user view of the Results Display Workspace (interface 32 of FIG. 2). The learner may immediately select one or more of the listed education resources, request to see additional details on them, or request to see a response set graphic indicating the relative positioning of each resource along each of the axes (n-dimensions, relating to cost, time, quality and risk) specified earlier. If no acceptable education resources were provided, the learner may return to the Context Selection Workspace to redefine their query or select a different User Context such as "Commuting Techie" via the first interface. The learner may additionally elect to return to the Detail Specification Workspace of the second interface to change the default value of the context attribute "Connectivity" from Disconnected to Dial-up and add or remove Value Resource Parameters for the attribute value Dial-up or other context attribute values associated with context attributes such as "Learning Mode" or "Technical Field". The learner may also change their selection criteria, the weighting of the selection criteria, and the minimum/maximum values for any selection criteria, in hopes of identifying additional relevant resources.

With respect to the education domain, the user is a "learner" however, the three iconic workspaces of FIG. 2 provide the process for enabling the learner to specify example data elements, such as the example data elements depicted in the Education (e.g., Subject Matter) column 70 of FIG. 3, and view results, as follows: In the first process step, the learner uses the Context Selection Workspace (interface 12 of FIG. 4) to specify their query 71 as "Become a Linux developer by June" for example. The learner selects the User Context "Commuting Techie" from among the available context icons 72. The learner may elect to go to the Detail Specification Workspace in order to view the context attributes 73 associated with the "Commuting Techie" user context. Preferably, the default assigned context attribute value ("Programming", for example) for any context attribute ("Technical Field", for example) is visible on the context attribute icon ("Technical Field", for example, whose name is shown highlighted in FIG. 3). In addition, the learner may click on the context attribute ("Technical Field, to stay with the example) to display a pull down menu to view the other values 74 (in either picture or word format) that could be assigned to this attribute. The learner, for example, may select "Graphical Interfaces" shown highlighted in FIG. 3. By double clicking on this attribute value, the list of Value Resource Parameters (include/exclude filters 75) for the attribute value "Graphical Interfaces" will be displayed. For example, the learner may indicate that they want to include the KDE interface and exclude the GNOME interface when searching for relevant resources. The learner may additionally specify resource priorities 76 by selecting, sequencing and weighting and specifying minimum and maximum values for relevant criteria such as cost, time, quality and risk on the Resource Selection Criteria Definition graphical user interface element on the Detail Specification Workspace. The results of the learner's search are listed on the Results Display Workspace via the interface 32. The learner may immediately select one or more of the listed education resources, request to see additional details on them, or request to see a response set graphic indicating the relative positioning of each resource along each of the axes (n-dimensions, relating to cost, time, quality and risk) specified earlier. If no acceptable education resources were provided, the learner may return to the Context Selection Workspace 13 via the first interface 12 to redefine their query or select a different user context such as "Traveling Consultant." The learner may also elect to return to the Detail Specification Workspace via the second interface 22 to change the default value of the context attribute "Technical Field" from Graphical Interfaces to Programming and add or remove Value Resource Parameters for the attribute value Programming or other context attribute values associated with context attributes such as "Learning Mode" or "Connectivity." The learner may also change their selection criteria, the weighting of the selection criteria, and the minimum/maximum values for any selection criteria, in hopes of identifying additional relevant resources.

With respect to the real-estate domain, the user is a real estate transactor (renter/buyer) and FIG. 3 depicts an example interaction with the system through the iconic interfaces (FIG. 2) included in the embodiment of the invention as applied to the real estate domain. The three iconic workspaces of FIG. 2 enable a real estate renter or buyer to specify example data elements, such as the example data elements depicted in the Real Estate column 80 of FIG. 3, and view results, as follows: In the first process step, the renter or buyer uses the Context Selection Workspace to specify their query 81 as "Find housing near new job by August." The renter or buyer selects the user context "Relocating Business Professional" from among the available context icons 82. The renter or buyer may elect to go to the Detail Specification Workspace in the second interface in order to view the context attributes 83 associated with the "Relocating Business Professional" user context. Preferably, the default assigned context attribute value ("Subcontract it all", for example) for any context attribute ("Maintenance Style", for example) is visible on the context attribute icon ("Maintenance Style", for example, whose name is shown highlighted in FIG. 3). In addition, the renter/buyer may click on the context attribute ("Maintenance style, to stay with the example) to display a pull down menu to view the other values 84 (in either picture or word format) that could be assigned to this attribute. Upon renter or buyer double clicking on attribute value "Do-It-YourSelf-er", for example, the list of Value Resource Parameters (include/exclude filters 85) for the attribute value "Do-It-YourSelf-er" is displayed. For example, as shown in FIG. 3, the renter or buyer may indicate that they want to include walls, paint and lawn mowing and exclude plumbing, electrical and landscaping when searching for relevant resources. The renter or buyer may additionally specify resource priorities 86 by selecting, sequencing and weighting and specifying minimum and maximum values for relevant criteria such as cost, time, quality and risk on the Resource Selection Criteria Definition graphical user interface element on the Detail Specification Workspace. The results of the renter or buyer's search are listed on the Results Display Workspace of the third interface 32 in which the renter or buyer may immediately select one or more of the listed real estate resources, request to see additional details on them, or request to see a response set graphic indicating the relative positioning of each resource along each of the axes (n-dimensions, relating to cost, time, quality and risk) specified earlier. If no acceptable housing resources were provided, the renter or buyer may return to the Context Selection Workspace to redefine their query or select a different user context such as "Empty Nester." The renter or buyer can also elect to return to the Detail Specification Workspace to change the default value of the context attribute "Maintenance Style" from Do-It-Yourself-er to Subcontract It All, for example, and add or remove Value Resource Parameters for the attribute value "Subcontract It All" or other context attribute values associated with context attributes such as "Mode of Commute to Work/School" or "Mode of Housing." The real estate transactor may also change their selection criteria, the weighting of the selection criteria, and the minimum/maximum values for any selection criteria, in hopes of identifying additional relevant resources.

With respect to the travel domain, the user is a traveler and FIG. 3 depicts an example interaction with the customer self service system through the iconic interfaces (FIG. 2) included in the embodiment of the invention as applied to the travel domain. The three iconic workspaces of FIG. 2 enable a traveler to specify data elements, such as the example data elements depicted in the Travel column 90 of FIG. 3, and view results, as follows: In the first process step, the traveler uses the Context Selection Workspace to specify their query 91 such as "Plan a trip to Vermont in June", for example. The traveler may then select the User Context Icon "Single Mom with kids", for example, from among the available user context icons 132, (where the icon's name 92 is highlighted in FIG. 3). The traveler may then elect to go to the Detail Specification Workspace in order to view the context attributes 93 associated with the "Single Mom with Kids" user context. Preferably, the default assigned context attribute value ("Drive", for example) for any context attribute ("Mode of Transportation", for example) is visible on the context attribute icon ("Mode of Transportation", for example, whose name is shown highlighted in FIG. 3). In addition, the traveler may click on the context attribute ("Mode of Transportation", to stay with the example) to display a pull down menu to view the other values 94 (in either picture or word format) that could be assigned to this attribute ("Fly" for example). The traveler selects "fly" as an alternative to "drive", as illustrated with highlighting in FIG. 3. By "overriding" this attribute value and double clicking on it, the list of Value Resource parameters (include/exclude filters 95) for the attribute value "Fly" is displayed. The traveler may indicate that he/she wants to include all major carriers and exclude prop planes and airlines with bad safety records when searching for relevant resources. The traveler may also specify resource priorities 96 by selecting, sequencing and weighting and specifying minimum and maximum values for relevant criteria such as cost, time, quality and risk on the Resource Selection Criteria Definition graphical user interface element on the Detail Specification Workspace. The results of the traveler's search are then displayed via the Results Display Workspace of the third iconic interface 32 of FIG. 2. The traveler may immediately select one or more of the listed travel resources, request to see additional details on them, or request to see a response set graphic indicating the relative positioning of each resource along each of the axes (n-dimensions, relating to cost, time, quality and risk) specified earlier. If no acceptable travel resources were provided, the traveler may return to the Context Selection Workspace in Step 1 to redefine their query or select a different user context such as "Swinging Singles." The traveler may also elect to return to the Detail Specification Workspace in Step 2 to change the default value of the context attribute "Mode of Transportation" from Fly to Train and add or remove Value Resource Parameters for the attribute value Train or other context attribute values associated with context attributes such as "Mode of Housing" or "Food Style". The traveler may also change their selection criteria, the weighting of the selection criteria, and the minimum/maximum values for any selection criteria, in hopes of identifying additional relevant resources.

Referring back to FIG. 1, the customer self service system implements an n-dimensional context vector 25', derived from the combination of user context and previous interaction with the system, to map specific contexts to specific resources. This increases the relevance of search results for a given user in their current context without requiring the user to explicitly train the system. Inferences and conclusions are made regarding both the individual user's preferred resource characteristics and those of a common set of users. These are used as input to the sub-processes described above to modify the iconic interfaces presented to each particular user for their subsequent search using the current invention as well as to modify the results that would be selected for presentation to the user via the interface described herein in response to an identical search. Over time, the system will improve in its ability to serve individual needs and evolve to an ability to suggest preferred answers to groups of users.

The overall system also uses a batch background process described herein to cluster user interaction records to assist in the identification of new user contexts which serves to improve the system over time.

While the prior art has made use of adaptive learning in information retrieval systems, the overall customer self service system for resource search and selection enables the use of a large, rich set of contextual attribute-value pairs, is focused on learning about the user/user groups rather than the resources/resource groups and is able to discover user group characteristics and apply them to individuals. Much of the prior art is focused on the discovery of database structure, the clustering of data within the resources, or discovering relevant taxonomy for resources but the current system discovers contexts and context attributes among users which can be used predictively. The customer self service system of the invention uses a highly specialized and optimized combination of supervised and unsupervised logic along with both automated and semi-automated entry of learned results and is able to deliver higher value because contexts are used in a closed loop self improvement system; front end (entry) middle (search and display) and back end (results and user feedback) are integrated. Other systems apply machine learning at the front, middle, or back, but not integrated throughout. The current system identifies context classifications and functions, and applies them to individual users to reduce the burden of fully communicating their question and increasing the specificity and accuracy of a query's search parameters. The current system identifies and improves selection logic and identifies and improves response sets to common queries based upon a rich set of contextual variables. The current system additionally orders the response set, potentially further limiting it, and prepares the response set for display in a way that identifies the "best" resources for a particular user based upon the rich set of context variables. The display of the invention additionally illustrates the decision making characteristics of the alternatives presented.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A customer self service system for performing resource search and selection comprising:

a mechanism enabling entry of a query for a resource and, entry of one or more user context elements, each element representing a context associated with the current user state and having context attributes and attribute values associated therewith, said mechanism further enabling user specification of relevant resource selection criteria for enabling expression of relevance of resource results in terms of user context;

a mechanism for searching a resource database and generating a resource response set having resources that best match a user's query, user context attributes and user defined relevant resource selection criteria, said resource response set being presented to said user in a manner whereby a relevance of each said resources being expressed in terms of user context in a manner optimized to facilitate resource selection; and, a mechanism for enabling continued user selection and modification of context attribute values to enable increased specificity and accuracy of a user's query to thereby result in improved selection logic and attainment of resource response sets best fitted to said query.

2. The customer self service system as claimed in claim 1, further comprising a user interaction database comprising user interaction data relating to previous system interactions including data relating to past user queries entered into the system and associated user contexts for particular users, and user's responses relating to those interactions.

3. The customer self service system as claimed in claim 2, wherein said search mechanism comprises:

a context attribute database comprising types of user contexts and one or more context attributes associated with each user context for processing by said system and, comprising functions for computing values for each context attribute; and, a user context classifier device for receiving a user query and a context vector comprising data associating an interaction state with said user, and processing said query and context vector against data included in said context attribute database for generating context parameters that predict a particular user context, wherein said classifier device populates said user context vector with context parameters specifying a user interaction state for use in a subsequent resource search.

4. The customer self service system as claimed in claim 3, wherein said user context classifier device includes processing mechanism for applying said functions to context for specifying said user interaction state, said mechanism further annotating the context vector with a set of context parameters for use in subsequent processing.

5. The customer self service system as claimed in claim 4, wherein said processing mechanism implements an inductive learning algorithm for predicting said user contexts.

6. The customer self service system as claimed in claim 4, further including updating mechanism for providing additions and modifications to a set of context attribute functions resulting in increasing ability to predict derived contexts as functions of the raw contexts, whereby the attribute functions database is enhanced.

7. The customer self service system as claimed in claim 6, wherein said updating mechanism for updating the attribute value functions database comprising mechanism for analyzing historical user interaction data from the user interaction database and learning how context attribute values map to context attribute functions, wherein said data from the user records database serves as a training set for continuous improvement of said functions in said database.

8. The customer self service system as claimed in claim 7, wherein said previous system interaction data further includes prior transactions of a current user and prior transactions of other similar users, wherein common behaviors and acceptance criteria are determined for updating said functions.

9. The customer self service system as claimed in claim 3, wherein said search mechanism further comprises:

mechanism for receiving a current user query for requesting resources and said user context vector associated with said current user query;

mechanism for applying resource indexing functions to map each user query and associated context vector to a sub-set of resources from a resource library, and generating a response set including said sub-set of resources that are most relevant to said user's query, said indexing functions including resource parameters for facilitating narrower searches.

10. The customer self service system as claimed in claim 9, further including: adaptive indexing process for enhancing said resource indexing functions by increasing their relevance and specificity for mapping user queries to resources, said adaptive indexing function increasing the value of search results for a current user in their context.

11. The customer self service system as claimed in claim 10, wherein said database of user interaction records further includes actual resources selected by the users, said adaptive indexing process implementing a supervised learning algorithm for receiving user interaction data from among said database of user interaction records and resources from said resource library and, adapting resource indexing functions based on a history of user interactions with said system as provided in said database of user interaction records.

12. The customer self service system as claimed in claim 11, wherein said user interaction data comprises user interaction feedback including history of prior interaction with the resource search and selection system, said supervised learning algorithm optimizing a performance of said resource indexing functions as measured by an evaluation metric applied to the user interaction feedback.

13. The customer self service system as claimed in claim 9, wherein said search mechanism further comprises:

mechanism for receiving said resource response set of results obtained in response to a current user query, and receiving said user context vector associated with said current user query, and, an ordering and annotation function for mapping the user context vector with the resource response set to generate an annotated response set having one or more annotations for controlling the presentation of the resources to the user, wherein the ordering and annotation function is executed interactively at the time of each user query.

14. The customer self service system as claimed in claim 13, wherein said annotations include elements for ordering resources results for presentation to said user via a graphic user interface.

15. The customer self service system as claimed in claim 13, wherein said user interaction records includes actual resources selected by the users and the annotation schemes used for presenting them, said ordering and annotation function implementing a supervised learning algorithm for receiving user interaction data and an annotation scoring metric representing a measure of performance in locating resource response results presented to said user, and, generating said ordering and annotation function, said annotation function being adaptable based on history of user interactions.

16. The customer self service system as claimed in claim 15, wherein said user interaction data comprises user interaction feedback, said supervised learning algorithm optimizing said annotation scoring metric as measured by said user interaction feedback.

17. The customer self service system as claimed in claim 13, further comprising context clustering mechanism for receiving said user interaction data and a distance metric for associating closeness of said user interaction data and, clustering said user interaction data according to said distance metric to determine new user contexts and associated attributes for use in subsequent resource searches initiated by users in said system, wherein improved query definition and resource lookup results from said new determined user context attributes.

18. The customer self service system as claimed in claim 17, wherein a system administrator updates said context attribute database with determined new user contexts and associated context attributes and, further, develops new context attribute functions for computing values for new user context attributes, and assigns new records in said user interaction records database with values for those attributes, said updating of context assignments serve as the training data for continuously improving said functions in said context attributes database.

19. The customer self service system as claimed in claim 17, wherein said distance metric includes determining closeness of parameters of said user interaction data, a closeness parameter including similarity of result sets of a user query.

20. The customer self service system as claimed in claim 17, wherein said system administrator develops new definitions and logic for mapping specific resources to specific context sets.

21. The customer self service system as claimed in claim 17, wherein said context clustering mechanism implements an unsupervised clustering algorithm for clustering said user interaction data records.

22. The customer self service system as claimed in claim 13, wherein said resource response set is presented to said user via a graphical user interface (GUI), said GUI comprising:
- a first graphic element for displaying said response set according to a defined ranking, said one or more ranked resources from said first graphic element being user selectable; and,
- a second graphic element for displaying a multi-dimensional plot comprising two or more axes with each axis corresponding to a user specified results selection criterion and each axis including points representing each of said resources selected from said first graphic element along each dimension.

23. The customer self service system as claimed in claim 22, further including mechanism for enabling user selection of a single point of a desired resource from said multi-dimensional plot, and enabling visualization of the same resource represented as a data point on each of said axes of said multi-dimensional plot in response to said single resource selection.

24. The customer self service system as claimed in claim 23, wherein said visualization of the same resource upon each of said axes includes graphically connecting a point corresponding to the selected resource to all the other points for that resource in said plot.

25. The customer self service system as claimed in claim 23, wherein each axis enables visualization of a ranking of said resources according to each selection criterion at each dimension.

26. The customer self service system as claimed in claim 23, wherein each axis of said multi-dimensional plot is displayed according to a user-defined sequence.

27. The customer self service system as claimed in claim 23, wherein said second graphic interface comprises a third graphic element for displaying a detailed description of each of said selected resources of said response set.

28. The customer self service system as claimed in claim 22, wherein said second graphic interface includes a display indicating a weighting of each user selected criterion at each dimension.

29. A method for performing resource search and selection in a customer self service system, said method comprising:
a) providing an interface enabling entry of a query for a resource and specification of one or more user context elements, each element representing a context associated with the current user state and having context attributes and attribute values associated therewith;
b) enabling user specification of relevant resource selection criteria for enabling expression of relevance of resource results in terms of user context;
c) searching a resource database and generating a resource response set having resources that best match a user's query, user context attributes and user defined relevant resource selection criteria;
d) presenting said resource response set to said user in a manner whereby a relevance of each said resources being expressed in terms of user context in a manner optimized to facilitate resource selection; and,
e) enabling continued user selection and modification of context attribute values to enable increased specificity and accuracy of a user's query to thereby result in improved selection logic and attainment of resource response sets best fitted to said query.

30. The method as claimed in claim 29, wherein said customer self service system comprises a user interaction database comprising user interaction data relating to previous system interactions including data relating to past user queries entered into the system and associated user contexts for particular users, and user's responses relating to those interactions, said searching step c) comprises the steps of:
- receiving a user query and a context vector comprising data associating an interaction state with said user; and,
- processing said query and context vector against data included in a context attribute database for generating context parameters that predict a particular user context, wherein said classifier device populates said user context vector with context parameters specifying a user interaction state for use in a subsequent resource search.

31. The method as claimed in claim 30, wherein said query processing step comprises the steps of:
- applying said functions to context for specifying said user interaction state; and
- annotating the context vector with a set of context parameters for use in subsequent processing.

32. The method as claimed in claim 31, further including the step of implementing an inductive learning algorithm for predicting said user contexts.

33. The method as claimed in claim 32, further including the step of providing additions and modifications to a set of context attribute functions resulting in increasing ability to predict derived contexts as functions of the raw contexts.

34. The method as claimed in claim 33, further including the step of updating an attribute value functions database by analyzing historical user interaction data from a user interaction database and learning how context attribute values map to context attribute functions, wherein said data from the user records database serves as a training set for continuous improvement of said functions in said database.

35. The method as claimed in claim 34, wherein said previous system interaction data further includes prior transactions of a current user and prior transactions of other similar users, said method including determining common behaviors and acceptance criteria for improving said functions.

36. The method as claimed in claim 30, wherein said searching step c) further comprises:
- receiving a current user query for requesting resources and said user context vector associated with said current user query; and
- applying resource indexing functions to map each user query and associated context vector to a sub-set of resources from a resource library; and,
- generating a response set including said sub-set of resources that are most relevant to said user's query, said indexing functions including resource parameters for facilitating narrower searches.

37. The method as claimed in claim 36, further including the step of enhancing said resource indexing functions by increasing their relevance and specificity for mapping user queries to resources.

38. The method as claimed in claim 37, wherein said database of user interaction records further includes actual resources selected by the users, said enhancing step including the step of implementing a supervised learning algorithm for receiving user interaction data from among said database of user interaction records and resources from said resource library and, adapting resource indexing functions based on a history of user interactions with said system as provided in said database of user interaction records.

39. The method as claimed in claim 38, wherein said user interaction data comprises user interaction feedback including history of prior interaction with the resource search and selection system, said supervised learning algorithm optimizing a performance of said resource indexing functions as measured by an evaluation metric applied to the user interaction feedback.

40. The method as claimed in claim 36, wherein said searching step c) further comprises the steps of:
   receiving said resource response set of results obtained in response to a current user query, and receiving said user context vector associated with said current user query; and,
   at the time of each user query, mapping the user context vector with the resource response set to generate an annotated response set having one or more annotations for controlling the presentation of the resources to the user.

41. The method as claimed in claim 40, wherein said annotations include elements for ordering resources results for presentation to said user via a graphic user interface.

42. The method as claimed in claim 41, wherein said presenting step d) further includes the step of presenting said resource response set to said user via a graphical user interface (GUI), said GUI comprising:
   a first graphic element for displaying said response set according to a defined ranking, said one or more ranked resources from said first graphic element being user selectable; and,
   a second graphic element for displaying a multi-dimensional plot comprising two or more axes with each axis corresponding to a user specified results selection criterion and each axis including points representing each of said resources selected from said first graphic element along each dimension.

43. The method as claimed in claim 42, further including the steps of:
   enabling user selection of a single point of a desired resource from said multi-dimensional plot; and,
   enabling visualization of the same resource represented as a data point on each of said axes of said multi-dimensional plot in response to said single resource selection.

44. The method as claimed in claim 43, further including the step of graphically connecting a point corresponding to the selected resource to all the other points for that resource in said plot.

45. The method as claimed in claim 40, wherein said user interaction records includes actual resources selected by the users and the annotation schemes used for presenting them, said method further including the steps of:
   implementing a supervised learning algorithm for receiving user interaction data and an annotation scoring metric representing a measure of performance in locating resource response results presented to said user; and,
   generating an ordering and annotation function for performing said mapping, and adapting said annotation function based on history of user interactions.

46. The method as claimed in claim 45, wherein said user interaction data comprises user interaction feedback, said supervised learning algorithm optimizing said annotation scoring metric as measured by said user interaction feedback.

47. The method as claimed in claim 40, further comprising the steps of:
   receiving said user interaction data and a distance metric for associating closeness of said user interaction data; and,
   clustering said user interaction data according to said distance metric to determine new user contexts and associated attributes for use in subsequent resource searches initiated by users in said system, wherein improved query definition and resource lookup results from said new determined user context attributes.

48. The method as claimed in claim 47, further including implementing services for:
   updating said context attribute database with determined new user contexts and associated context attributes and;
   developing new context attribute functions for computing values for new user context attributes; and,
   assigning new records in said user interaction records database with values for those attributes, said updating of context assignments serve as the training data for continuously improving said functions in said context attributes database.

49. The method as claimed in claim 48, wherein said distance metric includes determining closeness of parameters of said user interaction data, a closeness parameter including similarity of result sets of a user query.

50. The method as claimed in claim 48, further including the step of developing new definitions and logic for mapping specific resources to specific context sets.

51. The method as claimed in claim 50, further including the step of implementing an unsupervised clustering algorithm for clustering said user interaction data records.

* * * * *